United States Patent
Bai et al.

(10) Patent No.: US 12,537,613 B2
(45) Date of Patent: Jan. 27, 2026

(54) CONDITIONAL CELL SELECTION BASED ON BEAM PREDICTION

(71) Applicant: QUALCOMM Incorporated, San Diego, CA (US)

(72) Inventors: Tianyang Bai, Mountain View, CA (US); Hua Wang, Basking Ridge, NJ (US); Jelena Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 120 days.

(21) Appl. No.: 18/466,686

(22) Filed: Sep. 13, 2023

(65) Prior Publication Data

US 2025/0088291 A1    Mar. 13, 2025

(51) Int. Cl.
*H04B 17/309* (2015.01)
*H04B 7/06* (2006.01)
*H04B 17/373* (2015.01)

(52) U.S. Cl.
CPC ......... *H04B 17/309* (2015.01); *H04B 7/0695* (2013.01); *H04B 17/373* (2015.01)

(58) Field of Classification Search
CPC ... H04B 17/309; H04B 17/373; H04B 7/0695
See application file for complete search history.

(56) References Cited

U.S. PATENT DOCUMENTS

| 11,419,173 B2 | 8/2022 | Deenoo et al. | |
| 2023/0198604 A1* | 6/2023 | Bhamri | H04B 7/088 375/347 |
| 2023/0388871 A1* | 11/2023 | Guo | H04W 36/0069 |
| 2024/0147328 A1* | 5/2024 | Kim | H04W 36/08 |
| 2024/0381190 A1* | 11/2024 | Bai | H04W 36/0058 |

OTHER PUBLICATIONS

Ericsson: "Evaluation of AIML for beam management", 3GPP TSG-RAN WG1 Meeting #112-bis-e, R1-2302878, 3rd Generation Partnership Project, Mobile Competence Centre, 650, Route Des Lucioles, F-06921, Sophia-Antipolis Cedex, France, vol. 3GPP RAN 1, No. Online, Apr. 17, 2023-Apr. 26, 2023, Apr. 6, 2023, 43 Pages, XP052352360, paragraphs [0001], [02.2], [5.3.9], [0007].
International Search Report and Written Opinion—PCT/US2024/042134—ISA/EPO—Nov. 13, 2024 (2308046WO).

\* cited by examiner

*Primary Examiner* — Jaison Joseph
(74) *Attorney, Agent, or Firm* — Holland & Hart LLP

(57) ABSTRACT

Methods, systems, and devices for wireless communications are described that provide for a user equipment (UE) to be configured to perform beam prediction for one or more unmeasured beams of a set of beams configured for lower-layer triggered mobility (LTM). A UE may receive configuration information from a network entity that configures LTM using predicted beam measurements, and may initiate mobility from a first cell to a second cell based at least in part on the predicted beam measurements. The UE may transmit to the second cell directly to initiate mobility, or may transmit one or more beam reports to the first cell to initiate mobility. A relatively low confidence level of a prediction may trigger transmission of one or more aperiodic on-demand reference signals from a candidate cell. A UE may also transmit a capability indication of UE capabilities related to beam prediction for LTM.

28 Claims, 24 Drawing Sheets

CONDITIONAL CELL SELECTION BASED ON BEAM PREDICTION

FIELD OF TECHNOLOGY

The following relates to wireless communications, including conditional cell selection based on beam prediction.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support conditional cell selection based on beam prediction. For example, the described techniques provide for a user equipment (UE) to be configured to perform beam prediction for one or more unmeasured beams of a set of beams configured for lower-layer triggered mobility (LTM). In some aspects, a UE may receive configuration information from a network entity that configures LTM using predicted beam measurements, and may initiate mobility from a first cell to a second cell based at least in part on the predicted beam measurements. In some aspects, the UE may transmit one or more beam reports that include indications of which metrics are predicted versus measured beam metrics, confidence levels of predicted values, or any combinations thereof. In some aspects, a relatively low confidence level may trigger transmission of one or more aperiodic on-demand reference signals from one or more candidate cells. A UE may also transmit a capability indication to the network that provides UE capabilities related to beam prediction for LTM, and the network may configure the UE in accordance with the indicated capability (e.g., a number of machine learning (ML) models supported by the UE, a level of prediction capabilities, or any combinations thereof).

A method for wireless communications by a user equipment (UE) is described. The method may include receiving configuration information for a set of beams of a set of multiple candidate cells that are to be measured for a lower-layer triggered mobility procedure, the configuration information including one or more parameters for prediction of one or more beam measurements for one or more beams of the set of beams, measuring a first subset of reference signals transmitted using a first subset of the set of beams to obtain a first subset of beam metrics, predicting, based on the configuration information, a second subset of beam metrics for a second subset of the set of beams, the second subset of beams including different beams than the first subset of the set of beams, and initiating the lower-layer triggered mobility procedure based on the second subset of beam metrics.

A UE for wireless communications is described. The UE may include one or more memories storing processor executable code, and one or more processors coupled with the one or more memories. The one or more processors may individually or collectively operable to execute the code to cause the UE to receive configuration information for a set of beams of a set of multiple candidate cells that are to be measured for a lower-layer triggered mobility procedure, the configuration information including one or more parameters for prediction of one or more beam measurements for one or more beams of the set of beams, measure a first subset of reference signals transmitted using a first subset of the set of beams to obtain a first subset of beam metrics, predict, based on the configuration information, a second subset of beam metrics for a second subset of the set of beams, the second subset of beams including different beams than the first subset of the set of beams, and initiate the lower-layer triggered mobility procedure based on the second subset of beam metrics.

Another UE for wireless communications is described. The UE may include means for receiving configuration information for a set of beams of a set of multiple candidate cells that are to be measured for a lower-layer triggered mobility procedure, the configuration information including one or more parameters for prediction of one or more beam measurements for one or more beams of the set of beams, means for measuring a first subset of reference signals transmitted using a first subset of the set of beams to obtain a first subset of beam metrics, means for predicting, based on the configuration information, a second subset of beam metrics for a second subset of the set of beams, the second subset of beams including different beams than the first subset of the set of beams, and means for initiating the lower-layer triggered mobility procedure based on the second subset of beam metrics.

A non-transitory computer-readable medium storing code for wireless communications is described. The code may include instructions executable by a processor to receive configuration information for a set of beams of a set of multiple candidate cells that are to be measured for a lower-layer triggered mobility procedure, the configuration information including one or more parameters for prediction of one or more beam measurements for one or more beams of the set of beams, measure a first subset of reference signals transmitted using a first subset of the set of beams to obtain a first subset of beam metrics, predict, based on the configuration information, a second subset of beam metrics for a second subset of the set of beams, the second subset of beams including different beams than the first subset of the set of beams, and initiate the lower-layer triggered mobility procedure based on the second subset of beam metrics.

In some examples of the method, UEs, and non-transitory computer-readable medium described herein, the predicting may include operations, features, means, or instructions for configuring a separate machine learning module for each cell of the set of multiple candidate cells, or one machine learning module for two or more candidate cells of the set of multiple candidate cells and obtaining an output from one or more machine learning modules that provides the second subset of beam metrics. In some examples of the method, UEs, and non-transitory computer-readable medium described herein, the predicting may include operations, features, means, or instructions for providing one or more channel measurements from one or more of a serving cell or one or more of the first subset of beam metrics as an input to the one or more machine learning modules, and where the output from the one or more machine learning modules further includes a confidence value associated with each predicted beam metric.

In some examples of the method, UEs, and non-transitory computer-readable medium described herein, the initiating the lower-layer triggered mobility procedure may include operations, features, means, or instructions for determining that at least a first beam metric of the second subset of beam metrics has an associated confidence level that exceeds a confidence threshold and triggering the lower-layer triggered mobility procedure based on the determining. In some examples of the method, UEs, and non-transitory computer-readable medium described herein, the initiating the lower-layer triggered mobility procedure may include operations, features, means, or instructions for transmitting an uplink communication to a target cell associated with the first beam metric to autonomously switch the target cell to be a primary cell. In some examples of the method, UEs, and non-transitory computer-readable medium described herein, the initiating the lower-layer triggered mobility procedure may include operations, features, means, or instructions for transmitting a mobility request to a source cell that indicates a target cell associated with the first beam metric and receiving a confirmation to switch the target cell to be a primary cell.

In some examples of the method, UEs, and non-transitory computer-readable medium described herein, the initiating the lower-layer triggered mobility procedure may include operations, features, means, or instructions for transmitting an event triggered report to a serving cell based on one or more beam metrics of the second subset of beam metrics satisfying a condition to trigger additional reference signal transmissions. In some examples of the method, UEs, and non-transitory computer-readable medium described herein, the condition to trigger additional reference signal transmissions is a predicted reference signal received power (RSRP) that is above a RSRP threshold value and a confidence that is below a confidence threshold value. In some examples of the method, UEs, and non-transitory computer-readable medium described herein, the event triggered report triggers transmission of an on-demand aperiodic reference signal transmission on a least one beam of the second subset of beams, and where cell selection is based on a measurement of the on-demand aperiodic reference signal.

Some examples of the method, UEs, and non-transitory computer-readable medium described herein may further include operations, features, means, or instructions for transmitting a measurement report to a serving cell that includes the first subset of beam metrics and the second subset of beam metrics and receiving updated configuration information that includes one or more updated parameters for prediction of one or more beam measurements for one or more beams of the set of beams.

In some examples of the method, UEs, and non-transitory computer-readable medium described herein, the initiating the lower-layer triggered mobility procedure may include operations, features, means, or instructions for transmitting a lower-layer triggered mobility beam report that includes the second subset of beam metrics and a confidence level associated with each predicted beam metric of the second subset of beam metrics. In some examples of the method, UEs, and non-transitory computer-readable medium described herein, the lower-layer triggered mobility beam report further includes one or more of an indication for each reported beam metric that indicates whether the associated beam metric is a measured metric or a predicted metric, or a time step for each predicted metric, and where each reported beam metric is a layer-one (L1) or a layer-three (L3) metric.

Some examples of the method, UEs, and non-transitory computer-readable medium described herein may further include operations, features, means, or instructions for transmitting a capability indication to a network entity that indicates a capability of the UE to perform beam metric prediction for one or more candidate cells as part of the lower-layer triggered mobility procedure.

A method for wireless communications by a network entity is described. The method may include transmitting, to a UE, configuration information for a set of beams of a set of multiple candidate cells that are to be measured for a lower-layer triggered mobility procedure, the configuration information including one or more parameters for prediction of one or more beam measurements for one or more beams of the set of beams, receiving, from the UE, an indication of one or more predicted beam metrics that satisfy a condition associated with the one or more parameters provided with the configuration information, and initiating the lower-layer triggered mobility procedure based on the received indication.

A network entity for wireless communications is described. The network entity may include one or more memories storing processor executable code, and one or more processors coupled with the one or more memories. The one or more processors may individually or collectively operable to execute the code to cause the network entity to transmit, to a UE, configuration information for a set of beams of a set of multiple candidate cells that are to be measured for a lower-layer triggered mobility procedure, the configuration information including one or more parameters for prediction of one or more beam measurements for one or more beams of the set of beams, receive, from the UE, an indication of one or more predicted beam metrics that satisfy a condition associated with the one or more parameters provided with the configuration information, and initiate the lower-layer triggered mobility procedure based on the received indication.

Another network entity for wireless communications is described. The network entity may include means for transmitting, to a UE, configuration information for a set of beams of a set of multiple candidate cells that are to be measured for a lower-layer triggered mobility procedure, the configuration information including one or more parameters for prediction of one or more beam measurements for one or more beams of the set of beams, means for receiving, from the UE, an indication of one or more predicted beam metrics that satisfy a condition associated with the one or more parameters provided with the configuration information, and means for initiating the lower-layer triggered mobility procedure based on the received indication.

A non-transitory computer-readable medium storing code for wireless communications is described. The code may include instructions executable by a processor to transmit, to a UE, configuration information for a set of beams of a set of multiple candidate cells that are to be measured for a lower-layer triggered mobility procedure, the configuration information including one or more parameters for prediction of one or more beam measurements for one or more beams of the set of beams, receive, from the UE, an indication of one or more predicted beam metrics that satisfy a condition associated with the one or more parameters provided with the configuration information, and initiate the lower-layer triggered mobility procedure based on the received indication.

In some examples of the method, network entities, and non-transitory computer-readable medium described herein, the configuration information indicates a configuration for a separate machine learning module for each cell of the set of multiple candidate cells, or one machine learning module for two or more candidate cells of the set of multiple candidate cells. In some examples of the method, network entities, and non-transitory computer-readable medium described herein, one or more channel measurements from one or more of a serving cell or one or more measured beam metrics on one or more of the candidate cells are provided as an input to the one or more machine learning modules, and where an output from the one or more machine learning modules includes a confidence value associated with each predicted beam metric.

In some examples of the method, network entities, and non-transitory computer-readable medium described herein, the initiating the lower-layer triggered mobility procedure may include operations, features, means, or instructions for determining that at least a first predicted beam metric has an associated confidence level that exceeds a confidence threshold and triggering a switch of the UE from a source cell to a target cell associated with the first predicted beam metric based on the determining.

In some examples of the method, network entities, and non-transitory computer-readable medium described herein, the UE transmits an uplink communication to a target cell associated with a predicted beam metric to autonomously switch a target cell to be a primary cell.

Some examples of the method, network entities, and non-transitory computer-readable medium described herein may further include operations, features, means, or instructions for receiving, from the UE, a mobility request that indicates a target cell associated with a first beam metric and transmitting a confirmation to the UE to switch the target cell to be a primary cell.

In some examples of the method, network entities, and non-transitory computer-readable medium described herein, the receiving the indication of one or more predicted beam metrics may include operations, features, means, or instructions for receiving, from the UE, an event triggered report that indicates one or more predicted beam metrics satisfies a condition to trigger additional reference signal transmissions. In some examples of the method, network entities, and non-transitory computer-readable medium described herein, the condition to trigger additional reference signal transmissions is a predicted RSRP that is above a RSRP threshold value and a confidence that is below a confidence threshold value. Some examples of the method, network entities, and non-transitory computer-readable medium described herein may further include operations, features, means, or instructions for transmitting an indication to one or more of the candidate cells to trigger an on-demand aperiodic reference signal transmission on a least one beam of the one or more candidate cells, and where cell selection is based on a measurement at the UE of the on-demand aperiodic reference signal.

In some examples of the method, network entities, and non-transitory computer-readable medium described herein, the receiving the indication of one or more predicted beam metrics includes receiving a measurement report from the UE that includes a first subset of beam metrics that are measured beam metrics and a second subset of beam metrics that are predicted beam metrics and the method, apparatuses, and non-transitory computer-readable medium may include further operations, features, means, or instructions for transmitting, to the UE, updated configuration information that includes one or more updated parameters for prediction of one or more beam measurements for one or more beams of the set of beams.

In some examples of the method, network entities, and non-transitory computer-readable medium described herein, the receiving the indication of one or more predicted beam metrics may include operations, features, means, or instructions for receiving, from the UE, a lower-layer triggered mobility beam report that includes a first subset of measured beam metrics, a second subset of predicted beam metrics, and a confidence level associated with each predicted beam metric of the second subset of beam predicted metrics. In some examples of the method, network entities, and non-transitory computer-readable medium described herein, the lower-layer triggered mobility beam report further includes one or more of an indication for each reported beam metric that indicates whether the associated beam metric is a measured metric or a predicted metric, or a time step for each predicted metric, and where each reported beam metric is a L1 or a L3 metric.

Some examples of the method, network entities, and non-transitory computer-readable medium described herein may further include operations, features, means, or instructions for receiving, from the UE, a capability indication to a network entity that indicates a capability of the UE to perform beam metric prediction for one or more candidate cells as part of the lower-layer triggered mobility procedure, and where the configuration information is based on the capability indication.

DETAILED DESCRIPTION

Figure 1:
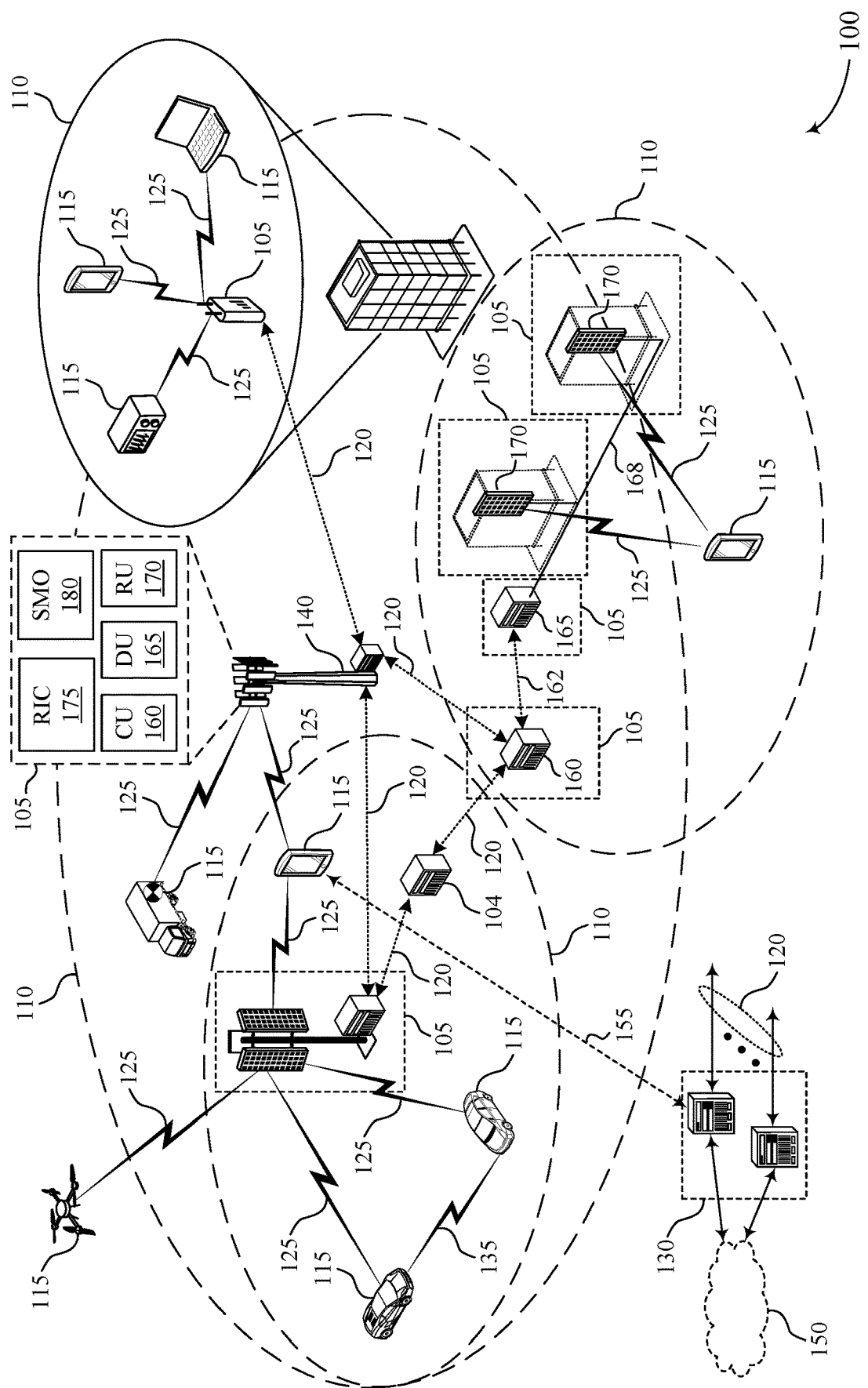
FIG. 1 shows an example of a wireless communications system that supports conditional cell selection based on beam prediction in accordance with one or more aspects of the present disclosure.

In some deployments, wireless communication networks may use beamformed communications which provide directional beams for communications. Such directional beams may provide relatively high communications bandwidth for a relatively small area as compared to, for example, an omni-directional transmission. In order to maintain channel quality using such communication techniques, a user equipment (UE) may measure reference signals (e.g., reference signals transmitted in synchronization signal blocks (SSBs)) from a serving beam and one or more other beams to monitor channel quality and identify if a switch to a different beam may provide better channel quality. Such techniques require a relatively large amount of overhead for link maintenance and mobility (e.g., beam and/or cell switching). For example, a UE may be configured with a set of candidate cells and beams to monitor for lower-layer triggered mobility (LTM) procedures. For each monitored beam, the UE may monitor for SSBs and perform beam measurements. Such procedures may consume a relatively large amount of power, and can take a relatively long duration of time due to the periodicity of SSB transmissions on beams that are to be measured. Thus, LTM procedures may rely on incomplete or outdated beam metric information. Enhanced techniques to improve mobility decisions for such LTM procedures would therefore be desirable, and may provide for more efficient and reliable mobility decisions and thereby enhance data throughput and reliability.

In accordance with various aspects as discussed herein, a UE may be configured to perform beam prediction for one or more unmeasured beams of a set of beams configured for LTM. In some aspects, a UE may receive configuration information from a network entity that configures LTM using predicted beam measurements, and may initiate mobility from a first cell to a second cell based at least in part on the predicted beam measurements. In some aspects, the UE may autonomously switch cells based on a predicted measurement by transmitting a message to a candidate cell that is part of the LTM configuration (e.g., based on a predicted RSRP of a beam of the candidate cell being above a RSRP threshold value and an associated confidence value being above a confidence threshold value). Additionally, or alternatively the UE may transmit one or more beam reports that include indications of which metrics are predicted versus measured beam metrics, confidence levels of predicted values, or any combinations thereof, and a serving cell may confirm a switch to a target cell. In some aspects, a relatively low confidence level associated with a predicted beam metric may trigger transmission of one or more aperiodic on-demand reference signals of the associated beam from a candidate cell. Additionally, or alternatively, a UE may also transmit a capability indication to the network that provides UE capabilities related to beam prediction for LTM, and the network may configure the UE in accordance with the indicated capability (e.g., a number of ML models supported by the UE, a level of prediction capabilities, or any combinations thereof).

Techniques as discussed herein may thus provide for more robust communications between devices by allowing for relatively rapid beam selection, cell selection, or both, based on both actual and predicted beam metrics. Such techniques may enhance communications by providing faster and more reliable mobility between beams and/or cells which may enhance communications throughput, reduce communications latency, enhance reliability, reduce power consumption (e.g., through reduced monitoring durations and reduced retransmissions), and enhance user experience.

Aspects of the disclosure are initially described in the context of wireless communications systems. Aspects of the disclosure are further illustrated by and described with reference to apparatus diagrams, system diagrams, process flows, and flowcharts that relate to conditional cell selection based on beam prediction.

FIG. 1 shows an example of a wireless communications system 100 that supports conditional cell selection based on beam prediction in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor.

One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support conditional cell selection based on beam prediction as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHZ, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., A base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

In some aspects, a UE 115 may be configured to perform beam prediction for one or more unmeasured beams of a set of beams as part of a lower-layer triggered mobility (LTM) procedure. In some aspects, a UE 115 may receive configuration information from a network entity 105 that configures LTM using predicted beam measurements, and may initiate mobility from a first cell to a second cell based at least in part on the predicted beam measurements. In some aspects, the UE 115 may autonomously switch a candidate cell to be a primary cell (PCell) by transmitting to the candidate cell. In other aspects, the UE 115 may transmit one or more beam reports that include indications of which metrics are predicted versus measured beam metrics, confidence levels of predicted values, or any combinations thereof, and the network entity 105 may confirm that the UE 115 is to switch cells. In some aspects, a relatively low confidence level of one or more predictions may trigger transmission of one or more aperiodic on-demand reference signals from one or more candidate cells. Additionally, or alternatively, a UE 115 may transmit a capability indication to the network entity 105 that provides UE 115 capabilities related to beam prediction for LTM, and the network entity 105 may configure the UE 115 in accordance with the indicated capability (e.g., a number of ML models supported by the UE 115, a level of prediction capabilities, or any combinations thereof).

Figure 2:
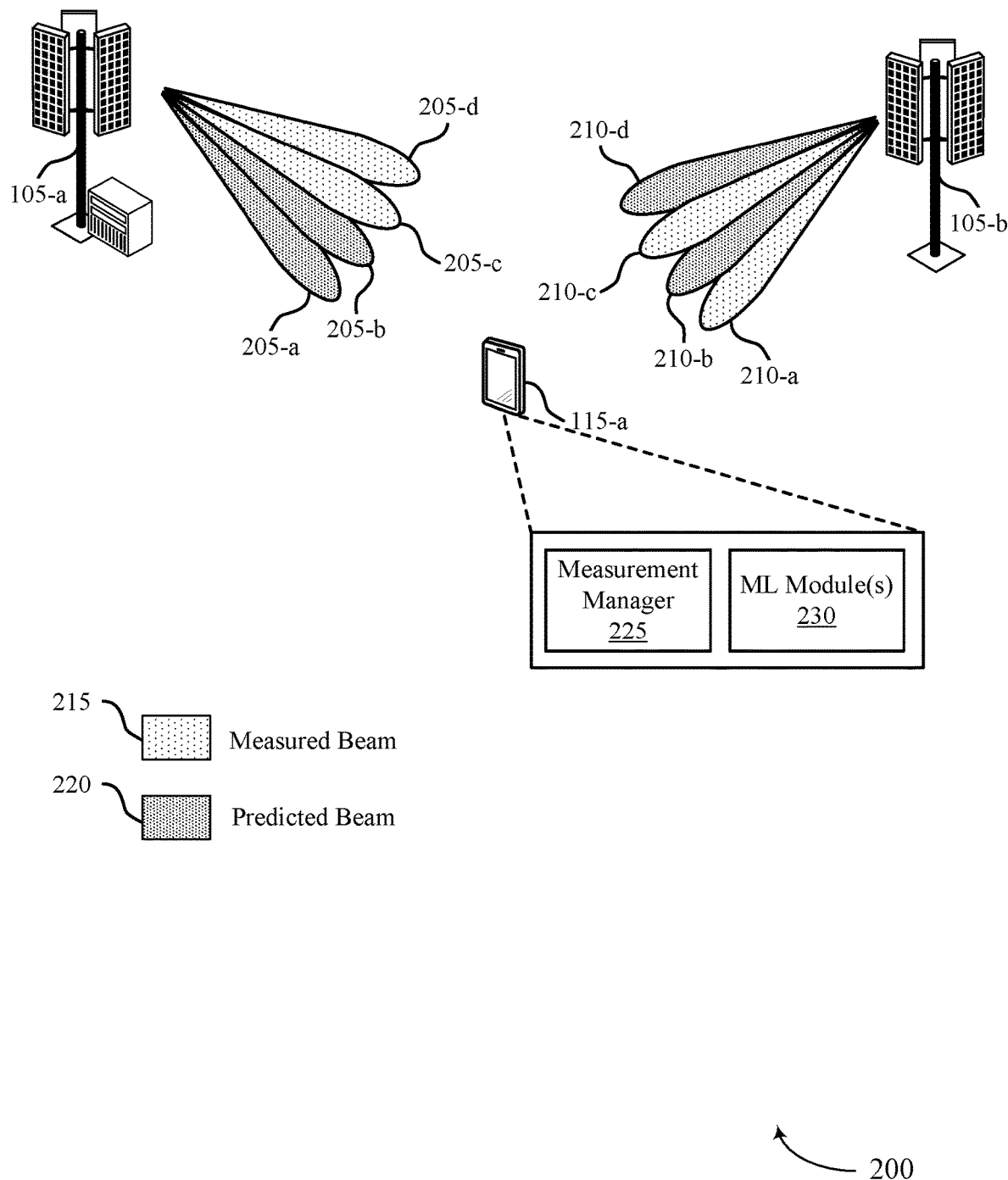
FIG. 2 shows an example of a wireless communications system that supports conditional cell selection based on beam prediction in accordance with one or more aspects of the present disclosure.

FIG. 2 shows an example of a wireless communications system 200 that supports conditional cell selection based on beam prediction in accordance with one or more aspects of the present disclosure. In some examples, aspects of the wireless communications system 200 may implement or be implemented by aspects of the wireless communications system 100. For example, the wireless communications system 200 may include a UE 115-a, a first network entity 105-a, and a second network entity 105-b, which may be examples of the corresponding devices as described with reference to FIG. 1.

The first network entity 105-a (which may correspond to a first cell) and the second network entity 105-b (which may correspond to a second cell) may communicate with the UE 115-a using beamformed signaling. For example, the first network entity 105-a (or first cell) may transmit multiple beams 205, including first beam 205-a, second beam 205-b, third beam 205-c, and fourth beam 205-d in this example. While not illustrated in the example of FIG. 2, the UE 115-a may transmit using multiple beams as well. Likewise, the second network entity 105-b (or second cell) may transmit multiple beams 210, including fifth beam 210-a, sixth beam 210-b, seventh beam 210-c, and eighth beam 210-d. It is to be understood that the number of beams in this example are provided for illustration and discussion purposes, and techniques as discussed herein may use different numbers of beams from different numbers of cells. Further, in some cases multiple cells may be provided by one network entity 105. In some examples, each of the beams 205 and each of the beams 210 may point in a different direction in the spatial domain. In some examples, the UE 115-a may use beamforming to receive signaling on the beams 205.

In accordance with various aspects, UE 115-a may be configured for LTM, with the first network entity 105-a providing an initial serving PCell, and the second network entity 105-b providing a candidate cell of the LTM procedure. The LTM procedure may trigger mobility of the UE 115-a from the initial serving PCell to the candidate cell based on one or more beam metrics of the serving PCell and the candidate cell. In some aspects, the UE 115-a may measure a first subset of beams, and may predict beam metrics for another subset of beams. For example, the UE 115-a may measure one or more beams 215 (e.g., third beam 205-c, fourth beam 205-d, fifth beam 210-a, and seventh beam 210-c) and obtain measured beam metrics (e.g., RSRP values). The UE 115-a may also use predicted beam metrics for one or more beams 220 (e.g., first beam 205-a, second beam 205-b, sixth beam 210-b, and eighth beam 210-d). For the predicted beams 220, the prediction may be used when a prior measurement of the beam is not available, or when a prior measurement of the beam is stale (e.g., when a time threshold of the associated measurement is exceeded, or if other events such as UE 115-a movement indicate that associated channel conditions have changed). In some aspects, a measurement manager 225 at the UE 115-a may be used to obtain the measured beam 215 metrics, and one or more ML modules 230 may be used to predict the predicted beam 220 metrics. Based on the measured and predicted beam metrics, the UE 115-a may initiate mobility from a serving beam 205 (e.g., third beam 205-c) of the first network entity 105-a to a candidate beam 210 (e.g., sixth beam 210-b) of the second network entity 105-b.

In some aspects, UE 115-a may use one or more ML models to predict channel characteristics for communications and obtain the predicted beam metrics. In some examples, the ML model may be an example of a deep learning ML model, where a deep learning ML model may include multiple layers of operations between input and output. For example, the ML model may represent a convolution neural network (CNN) model, a recurrent neural network (RNN) model, a generative adversarial network (GAN) model, or any other deep learning or other neural network model. In some examples, the ML model may represent a subset of RNN models, such as an LSTM model, where an LSTM model may involve learning and memorizing long-term dependencies over time to make predictions based on time series data. For example, the ML model may include an LSTM cell (e.g., an LSTM cell A) with a time-series input, and may transfer outputs from the LSTM cell into additional instances of the cell over time for selectively updating ML model values to make predictions. In some examples, the ML model may predict a matric associated with a reference signal beam based on historical measurements. For example, the ML model may predict whether or not an SSB beam that is a current serving beam will have the highest RSRP among a set of candidate beams at a measurement occasion.

In some examples, an ML model may be trained using a learning approach. Such training may be performed by the UE 115-a, or at a different entity that provides the ML model to the UE 115-a. For example, the UE 115-a, a network entity 105, or other component of a network, may train an ML model using supervised, semi-supervised, or unsupervised learning. Supervised learning may involve ML model training based on labeled training data, which may include example input-output pairs, whereas unsupervised learning may involve ML model training based on unlabeled training data, consisting of data without example input-output pairs. Semi-supervised learning may involve a small amount of labeled training data and a large amount of unlabeled training data. The trained ML model at the UE 115-a may then make predictions based on input data to generate one or more predicted beam metrics, along with one or more associated confidence values associated with each predicted beam metric. In some aspects, the input of the one or more ML modules 230 may be channel measurements from first network entity 105-a (e.g., a serving cell), one or more measurements from the second network entity 105-b (e.g., a candidate cell), or both. The output of one or more ML modules 230 may include at least a beam metric of the second network entity 105-b (e.g., candidate cell that is a configured LTM cell).

As discussed, the first network entity 105-a may configure the UE 115-a for LTM. For example, the LTM configuration may provide an indication of a subset of cells of an LTM candidate cell group (CG) via RRC configuration as a conditional cell/CG. In case of inter-DU LTM, the conditional cells/CGs may be defined per DU and there may be multiple configured sets of conditional cells/CGs, and the UE 115-*a* may use the set where its current serving cell/CG belongs to which may ensure the conditional LTM is executed only within a DU. In some cases, execution thresholds may be defined per configured set, such that the execution threshold is chosen depending on whether the conditional cell belongs to the same of different conditional cell/CG set as the serving cell. When one or more preconfigured conditions are fulfilled, the UE can either trigger a switch to the new cell/CG of the conditional CG (e.g., by activating a new cell/CG from the LTM candidate/conditional CG by L1/L2 signaling), or request from the serving cell to switch to the new cell/CG from LTM Candidate/Conditional CG (e.g., by sending a request to the serving cell by L1/L2 signaling for cell/CG update).

In some cases, conditional LTM triggers may be configured, such as measurements per network entity 105-*a* configuration, such as based on current or filtered metrics (e.g., cell or beam quality, number of 'good' beams, beam correlation, MPE), or absolute and relative channel quality comparisons (e.g., based on L1 measurement events configured for UE, including actual measurement, predicted measurements, or both). Other triggers may include, for example, a radio link failure (RLF) on current PCell, a beam failure detection or beam failure recovery procedure, reaching a specified threshold for beam failure indication (BFI) count on the Pcell, UE 115-*a* location and mobility information (e.g., used in conjunction with cell location, or based on prediction algorithms to predict a preferred candidate cell for L1/L2 mobility activation and Pcell selection), full-duplex capability of the candidate cell, or any combinations thereof. The above trigger events may be defined independently or may be considered in any combination.

Figure 3:
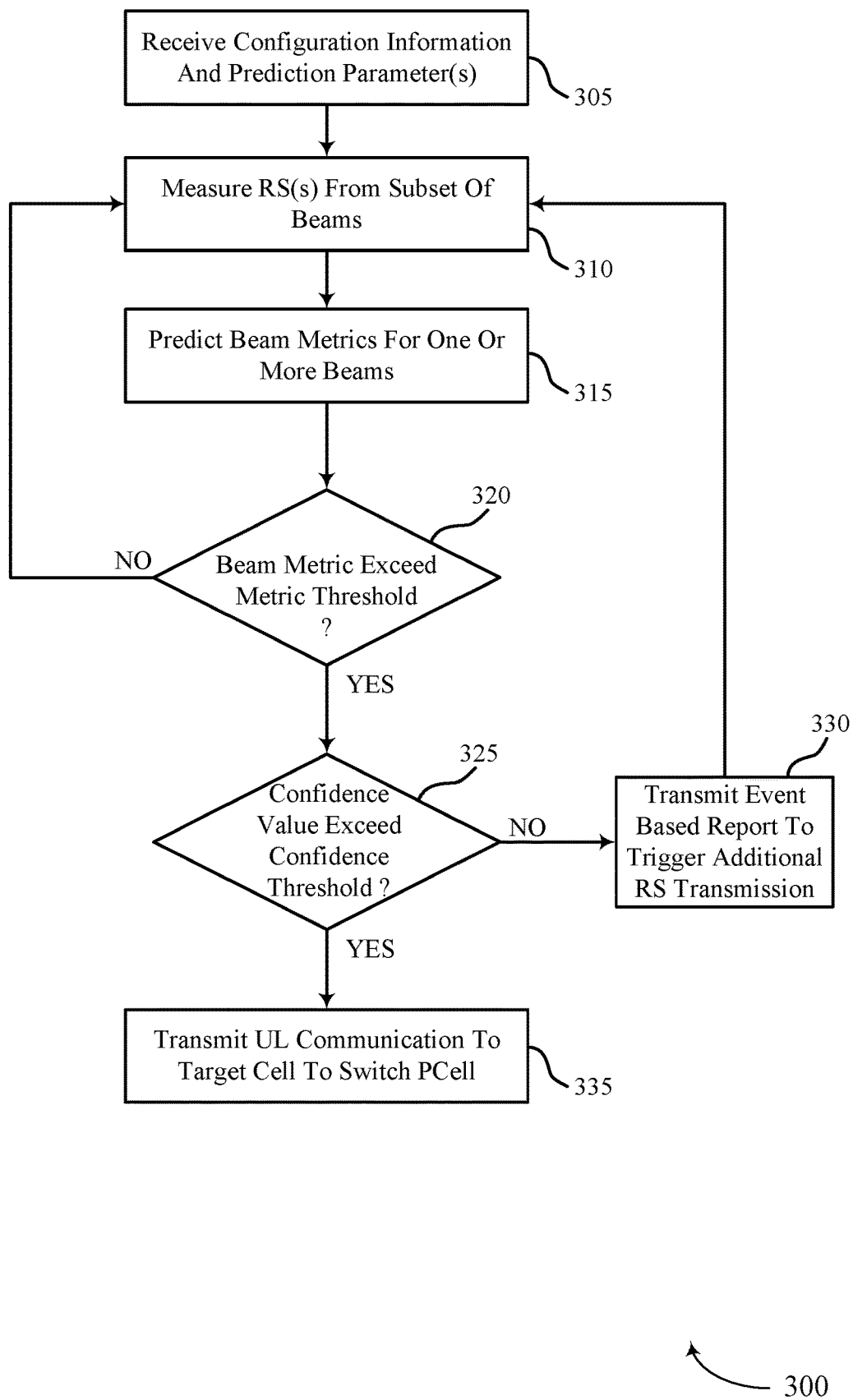
FIGS. 3 and 4 show examples of flowcharts illustrating methods that support conditional cell selection based on beam prediction in accordance with one or more aspects of the present disclosure.
Figure 4:
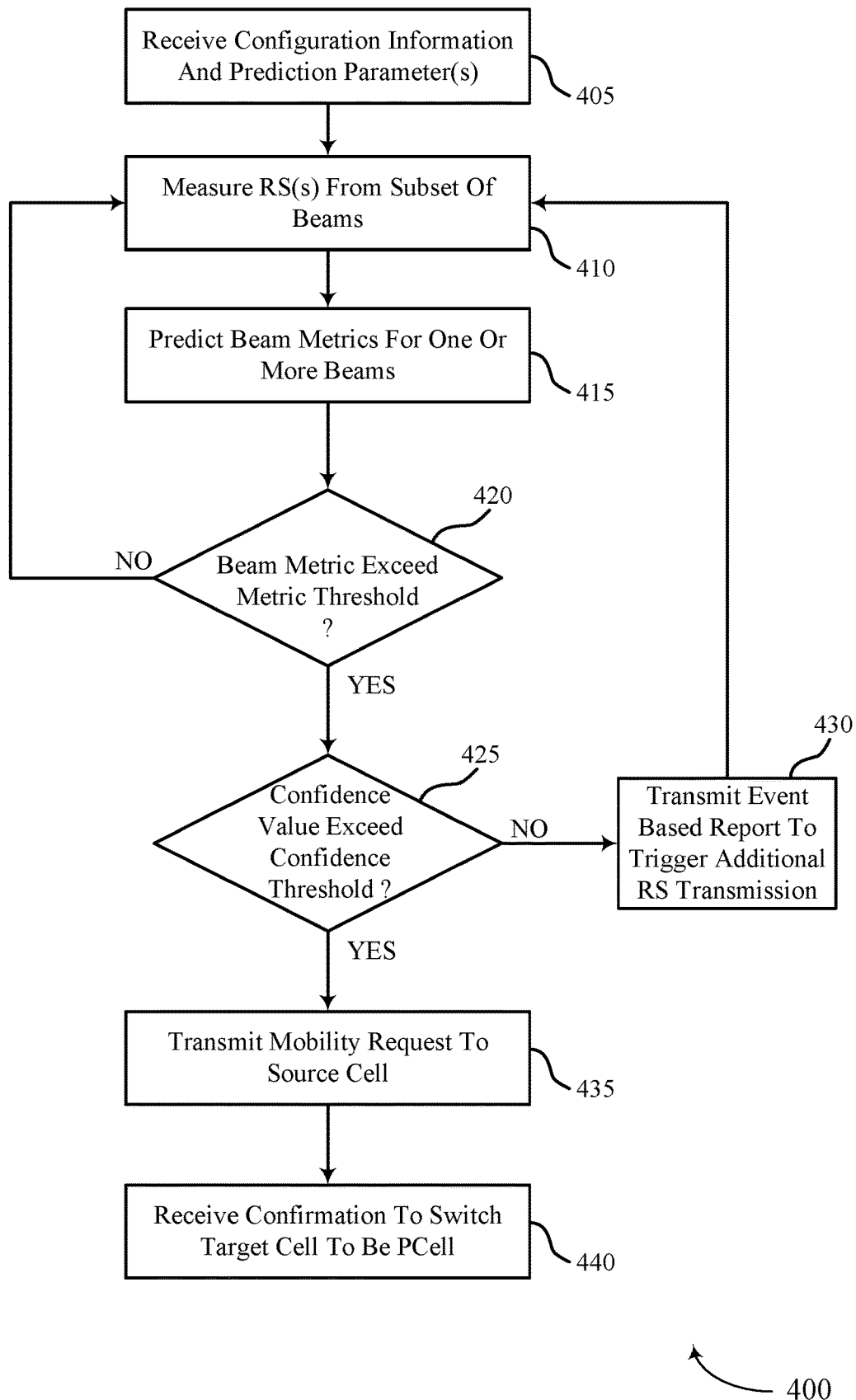
Figure 5:
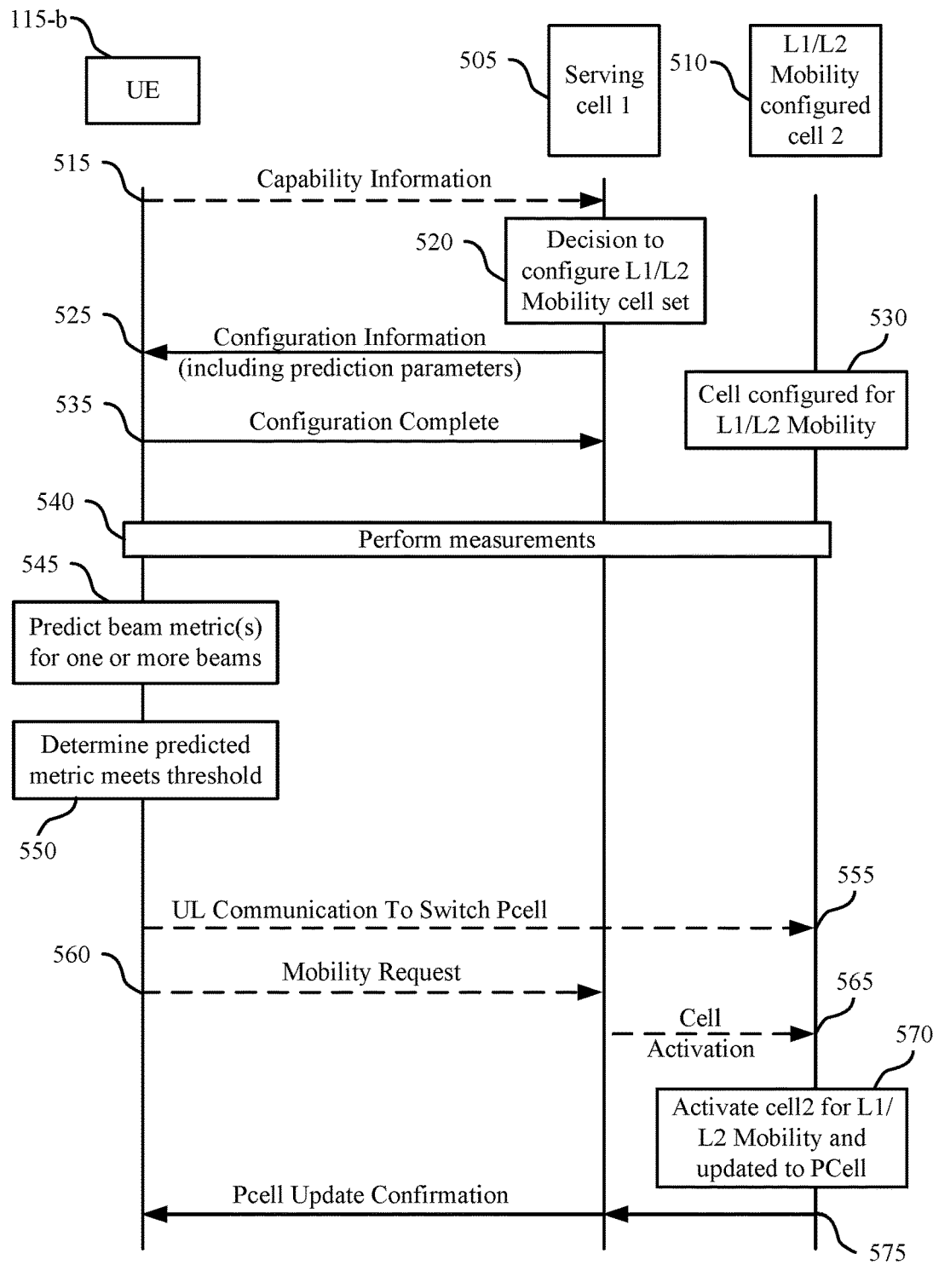
FIG. 5 shows an example of a process flow that supports conditional cell selection based on beam prediction in accordance with one or more aspects of the present disclosure.

In some cases, upon triggering a conditional LTM, the UE 115-*a* may transmit L1/L2 signaling to the current serving cell to notify it about the switch. Upon the notification, the communications with the UE 115-*a* will be expected at the target cell (e.g., second network entity 105-*b* or second cell), or directly switch to the target beam or cell and notify the target cell that the conditional LTM is executed (e.g., using random access channel resources, scheduling request resources, sounding reference signal resources, or other L1/L2 signaling). FIGS. 3 through 5 illustrate some examples of mobility based on predicted beam metrics in accordance with some aspects as discussed herein.

FIG. 3 shows an example of a flowchart 300 that supports conditional cell selection based on beam prediction in accordance with one or more aspects of the present disclosure. In some examples, aspects of the flowchart 300 may implement or be implemented by aspects of the wireless communication system 100 or the wireless communication system 200. For example, the operations of flowchart 300 may be implemented by a UE 115, which may be an example of the corresponding devices as described with reference to FIGS. 1-2.

In the following description of the flowchart 300, the described operations may be performed in a different order than the example order shown. Some operations may also be omitted from the flowchart 300, and other operations may be added to the flowchart 300. Further, although some operations or signaling may be shown to occur at different times for discussion purposes, these operations may actually occur at the same time.

At 305, the UE may receive configuration information for LTM, and one or more prediction parameters. In some case, the prediction parameters may include one or more threshold values for predicted beam metrics, one or more confidence value associated with predicted beam metrics, or both. In some cases, the configuration information may also provide a set of candidate cells, candidate beams, or both, that are to be monitored for potential mobility.

At 310, the UE may measure one or more reference signals from a subset of beams of the configured cells or beams. In some cases, the reference signals may be transmitted in SSBs that are monitored by the UE. The measured values may be used to determine one or more measured beam metrics.

At 315, the UE may predict one or more beam metrics for one or more beams. In some cases, the measured beams may be a subset of the set of configured beams of one or more cells, and other unmeasured beams of the set of configured beams may have beam metrics that are predicted by one or more prediction modules (e.g., ML modules) at the UE.

At 320, the UE may determine whether a beam metric exceeds a metric threshold value. In some cases, a measured beam metric may exceed the beam metric threshold. Further, one or more predicted beam metrics may exceed the beam metric threshold. In some cases, different beam measurement thresholds may be provided for measured and predicted beam metrics.

In the event that no beam metric exceeds the metric threshold, operations at 310 may be continued. In the event that a beam metric exceeds the metric threshold, at 325, the UE may determine whether a confidence value associated with the beam metric meets a confidence threshold. In cases where a predicted beam metric exceeds the metric threshold, the prediction module may provide a confidence value associated with the predicted metric that is compared with the confidence threshold value to determine if the confidence threshold is met. For example, a predicted standard deviation of an RSRP prediction may be compared against the confidence threshold and, if it is below the threshold value the predicted RSRP may be considered to be accurate). In other cases, a measured beam metric may exceed the beam metric threshold, and an associated confidence value may be set such that the confidence threshold is met. In further cases, a confidence value associated with a measured beam metric may change as a function of time since the measurement was obtained, such that older measurements may not meet the confidence threshold.

In the event that the confidence value does not satisfy the confidence threshold (e.g., a predicted standard deviation of a beam metric is greater than a threshold value), the UE, at 330, may transmit an event-based report to a serving cell, which may trigger one or more additional reference signal transmissions (e.g., an on-demand aperiodic reference signal transmission). In some cases, to reduce latency, on demand aperiodic reference signal may be triggered by the UE report, and based on the measurement of reference signal LTM cell switch may be further triggered in accordance with continuation of operations at block 410. In some cases, the aperiodic reference signal may be autonomously triggered based on UE sending the report. Further, in some cases, triggered reference signal may also help the UE to prepare for the UE side transmit and receive beam for the corresponding candidate cell. In the event that the confidence value satisfied the confidence threshold (e.g., a predicted standard deviation of the beam metric is less than a threshold value), at 335, the UE may transmit an uplink communication to a target cell that transmits the associated beam, to trigger mobility and switch the target cell to be a serving cell.

FIG. 4 shows an example of a flowchart 400 that supports conditional cell selection based on beam prediction in accordance with one or more aspects of the present disclosure. In some examples, aspects of the flowchart 400 may implement or be implemented by aspects of the wireless communication system 100 or the wireless communication system 200. For example, the operations of flowchart 400 may be implemented by a UE 115, which may be an example of the corresponding devices as described with reference to FIGS. 1-2.

In the following description of the flowchart 400, the described operations may be performed in a different order than the example order shown. Some operations may also be omitted from the flowchart 400, and other operations may be added to the flowchart 400. Further, although some operations or signaling may be shown to occur at different times for discussion purposes, these operations may actually occur at the same time.

At 405, the UE may receive configuration information for LTM, and one or more prediction parameters. In some case, the prediction parameters may include one or more threshold values for predicted beam metrics, one or more confidence value associated with predicted beam metrics, or both. In some cases, the configuration information may also provide a set of candidate cells, candidate beams, or both, that are to be monitored for potential mobility.

At 410, the UE may measure one or more reference signals from a subset of beams of the configured cells or beams. In some cases, the reference signals may be transmitted in SSBs that are monitored by the UE. The measured values may be used to determine one or more measured beam metrics.

At 415, the UE may predict one or more beam metrics for one or more beams. In some cases, the measured beams may be a subset of the set of configured beams of one or more cells, and other unmeasured beams of the set of configured beams may have beam metrics that are predicted by one or more prediction modules (e.g., ML modules) at the UE.

At 420, the UE may determine whether a beam metric exceeds a metric threshold value. In some cases, a measured beam metric may exceed the beam metric threshold. Further, one or more predicted beam metrics may exceed the beam metric threshold. In some cases, different beam measurement thresholds may be provided for measured and predicted beam metrics.

In the event that no beam metric exceeds the metric threshold, operations at 410 may be continued. In the event that a beam metric exceeds the metric threshold, at 425, the UE may determine whether a confidence value associated with the beam metric meets a confidence threshold. In cases where a predicted beam metric exceeds the metric threshold, the prediction module may provide a confidence value associated with the predicted metric that is compared with the confidence threshold value to determine if the confidence threshold is met. For example, a predicted standard deviation of an RSRP prediction may be compared against the confidence threshold and, if it is below the threshold value the predicted RSRP may be considered to be accurate). In other cases, a measured beam metric may exceed the beam metric threshold, and an associated confidence value may be set such that the confidence threshold is met. In further cases, a confidence value associated with a measured beam metric may change as a function of time since the measurement was obtained, such that older measurements may not meet the confidence threshold.

In the event that the confidence value does not satisfy the confidence threshold (e.g., a predicted standard deviation of a beam metric is greater than a threshold value), the UE, at 430, may transmit an event-based report to a serving cell, which may trigger one or more additional reference signal transmissions (e.g., an on-demand aperiodic reference signal transmission). In some cases, to reduce latency, on demand aperiodic reference signal may be triggered by the UE report, and based on the measurement of reference signal LTM cell switch may be further triggered in accordance with continuation of operations at block 410. In some cases, the aperiodic reference signal may be autonomously triggered based on UE sending the report. Further, in some cases, triggered reference signal may also help the UE to prepare for the UE side transmit and receive beam for the corresponding candidate cell.

In the event that the confidence value satisfies the confidence threshold (e.g., a predicted standard deviation of the beam metric is less than a threshold value), at 435, the UE may transmit a mobility request to its serving cell (e.g., source cell). At 440, the UE may receive a confirmation from the source cell to switch the target cell to be a serving cell (e.g., PCell). In some cases, the mobility request to the source cell may be transmitted based on a condition is that a predicted RSRP in a candidate cell is good, but the confidence of prediction is relatively low, but still meets a minimum confidence threshold, and thus further measurement may be needed to confirm the prediction (e.g., that could be indicated by the source cell in response to the mobility request).

In some aspects, in addition to triggering a cell switch, the output of the ML modules may be provided with the mobility request, or with the event-based report, and may trigger the UE and network entity to update the LTM configuration (e.g., update of LTM cell monitoring and measurements). For example, the UE may send a report to a serving cell regarding the prediction, and the report may trigger a change in the LTM candidate cells to monitor (the top N RSRP cells based on the report will be the LTM cells to monitor). Additionally, or alternatively, the report may change the reference signals for UE to monitor in the LTM measurement configuration. In some cases, the UE may make a recommendation on one or more cells that are good LTM candidates (e.g., plus which beams or reference signals may be good candidates in the corresponding cell) based on prediction.

Additionally, or alternatively, a LTM beam report may be extended to include prediction-based channel metric plus confidence level. For example, one or more bits may be included in a beam report to indicate which reported quantity is measured and which is predicted. In some cases, additional bits may be added to label the corresponding time step for the predicted channel metric (e.g., the prediction is for next X slots or Y ms). Such predicted channel metrics can be L1 or layer 3 (L3) metrics.

FIG. 5 shows an example of a process flow 500 that supports conditional cell selection based on beam prediction in accordance with one or more aspects of the present disclosure. In some examples, aspects of the process flow 500 may implement or be implemented by aspects of the wireless communication system 100 or the wireless communication system 200. For example, the operations of flowchart 300 may be implemented by a UE 115-*b*, a first serving cell 505 (which may be an example of a first network entity), and a second cell 510 configured for L1/L2 mobility (which may be an example of a second network entity), which may be examples of the corresponding devices as described with reference to FIGS. 1-4.

In the following description of the process flow 500, the operations between the first cell 505, second cell 510, and the UE 115-*b* may be performed in a different order than the example order shown. Some operations may also be omitted from the process flow 500, and other operations may be added to the process flow 500. Further, although some operations or signaling may be shown to occur at different times for discussion purposes, these operations may actually occur at the same time.

At 515, optionally, the UE 115-b may transmit capability information to the first cell 505. The capability information may include UE 115-b capabilities to perform LTM procedures, UE 115-b capabilities to determine predictive beam metrics associated with LTM, a number of ML modules available at the UE 115-b for predicting beam metrics, one or more types of ML models available at the UE 115-b, or any combinations thereof.

At 520, the first cell 505 may determine to configure LTM, and determine a L1/L2 mobility cell set. In some cases, such a determination may be made at a DU that is associated with both the first cell 505 and the second cell 510. The cell set may include one or more cells that are identified as candidate cells or cell groups. Further, each cell of the cell set may include multiple beams that may be monitored at the UE 115-b for triggering mobility between cells and beams. As discussed herein, the LTM configuration may also include one or more parameters for beam prediction. For example, the configuration may include one or more beam metric thresholds (e.g., threshold RSRP values) for triggering mobility between cells, one or more confidence thresholds for triggering mobility, or any combinations thereof.

At 525, the first cell 505 may transmit, and the UE 115-b may receive, configuration information for LTM to the UE 115-b. The configuration information may provide, for example, the one or more candidate cells or CGs, beam metric thresholds, predictive beam metric thresholds, confidence thresholds, or any combinations thereof. At 530, the second cell 510 may be configured for LTM (e.g., based on signaling from a DU or from the first cell 505). At 535, the UE 115-b may transmit, and the first cell 505 may receive, a configuration complete indication that indicates that the UE 115-b is operating according to the LTM configuration.

At 540, the UE 115-b may perform measurements on one or more reference signals transmitted on multiple beams from the first cell 505 and the second cell 510. For example, the UE 115-b may monitor for SSBs from the first cell 505 and the second cell 510, and measure RSRP or other beam metrics (e.g., signal to noise ratio, reference signal receive quality (RSRQ), received signal strength indicator (RSSI), etc.).

At 545, the UE 115-b may predict one or more beam metrics for one or more beams. In some cases, the beam metrics may be predicted by a ML module that is configured for the candidate cells, or by separate ML modules that are each configured for an associated candidate cell or beam.

At 550, the UE 115-b may determine that one or more of the predicted beam metrics meets a threshold value. In some cases, the threshold value may be a beam metric threshold value (e.g., an RSRP threshold). In some cases, the threshold value may also have an associated confidence threshold (e.g., a confidence value that is provided by the associated ML module that indicates a confidence of the prediction).

At 555, in some cases, the UE 115-b may transmit, and the second cell 510 may receive, an uplink communication to switch the second cell to be a serving cell of the UE 115-b (e.g., to a PCell). In other cases, at 560, the UE 115-b may transmit, and the first cell 505 may receive, a mobility request that identifies the candidate cell and beam. At 565, the first cell 505 may transmit a cell activation indication to the second cell 510.

At 570, the second cell may activate for communications with the UE 115-b and be updated to be a serving cell (e.g., PCell). At 575, the first cell 505 or the second cell 510 may transmit, and the UE 115-b may receive, a cell (e.g., PCell) update confirmation, and subsequent communications may occur using the second cell 510.

Figure 6:
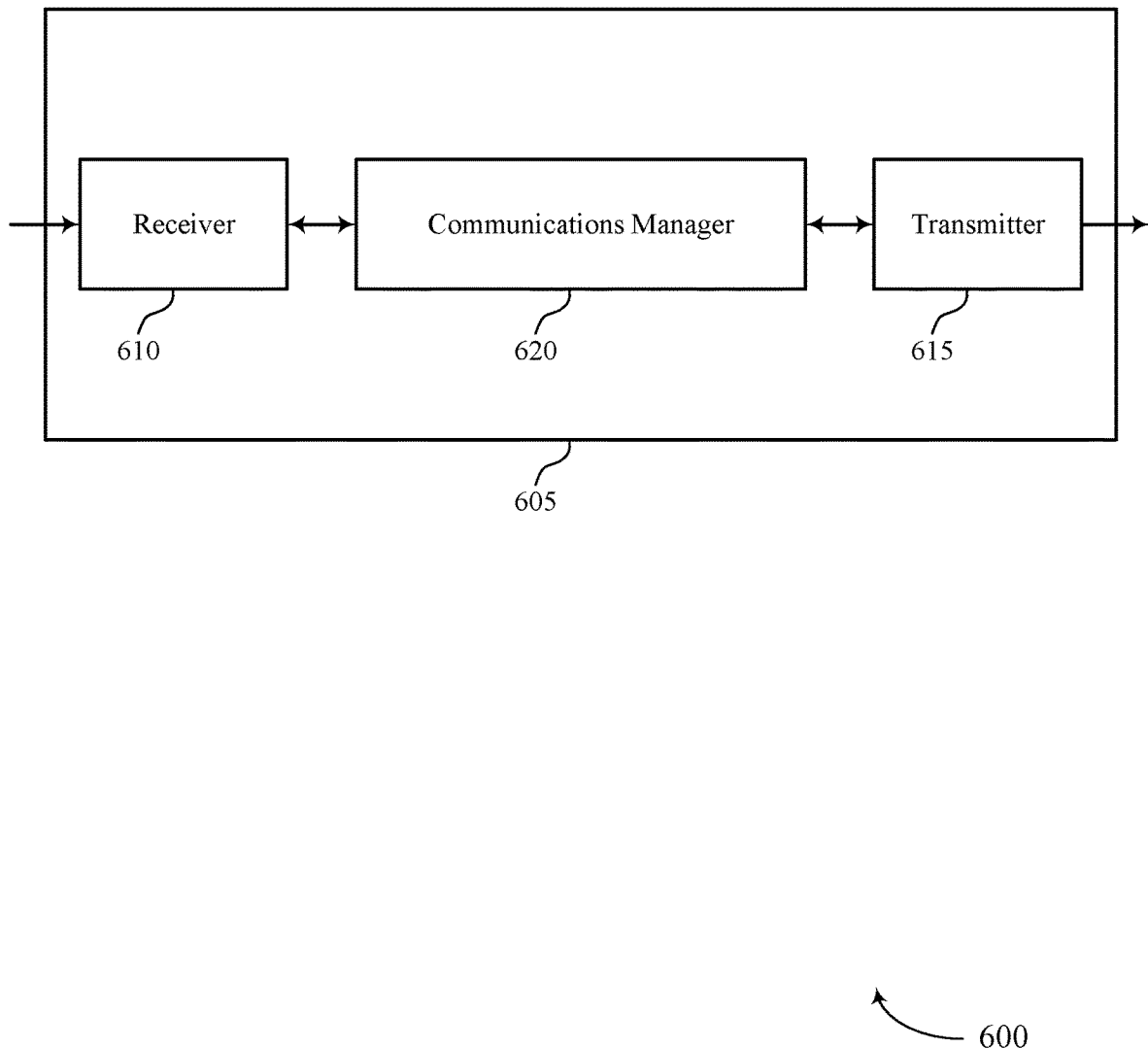
FIGS. 6 and 7 show block diagrams of devices that support conditional cell selection based on beam prediction in accordance with one or more aspects of the present disclosure.

FIG. 6 shows a block diagram 600 of a device 605 that supports conditional cell selection based on beam prediction in accordance with one or more aspects of the present disclosure. The device 605 may be an example of aspects of a UE 115 as described herein. The device 605 may include a receiver 610, a transmitter 615, and a communications manager 620. The device 605, or one or more components of the device 605 (e.g., the receiver 610, the transmitter 615, and the communications manager 620), may include at least one processor, which may be coupled with at least one memory, to, individually or collectively, support or enable the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to conditional cell selection based on beam prediction). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to conditional cell selection based on beam prediction). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of conditional cell selection based on beam prediction as described herein. For example, the communications manager 620, the receiver 610, the transmitter 615, or various combinations or components thereof may be capable of performing one or more of the functions described herein.

In some examples, the communications manager 620, the receiver 610, the transmitter 615, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 620, the receiver 610, the transmitter 615, or various combinations or components thereof may be implemented in code (e.g., as communications management software or firmware) executed by at least one processor. If implemented in code executed by at least one processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. For example, the communications manager 620 is capable of, configured to, or operable to support a means for receiving configuration information for a set of beams of a set of multiple candidate cells that are to be measured for a lower-layer triggered mobility procedure, the configuration information including one or more parameters for prediction of one or more beam measurements for one or more beams of the set of beams. The communications manager 620 is capable of, configured to, or operable to support a means for measuring a first subset of reference signals transmitted using a first subset of the set of beams to obtain a first subset of beam metrics. The communications manager 620 is capable of, configured to, or operable to support a means for predicting, based on the configuration information, a second subset of beam metrics for a second subset of the set of beams, the second subset of beams including different beams than the first subset of the set of beams. The communications manager 620 is capable of, configured to, or operable to support a means for initiating the lower-layer triggered mobility procedure based on the second subset of beam metrics.

By including or configuring the communications manager 620 in accordance with examples as described herein, the device 605 (e.g., at least one processor controlling or otherwise coupled with the receiver 610, the transmitter 615, the communications manager 620, or a combination thereof) may support techniques for lower-layer triggered mobility that may provide efficient cell switching for a UE that may enhance reliability and efficiency of communications, and provide for reduced power consumption.

Figure 7:
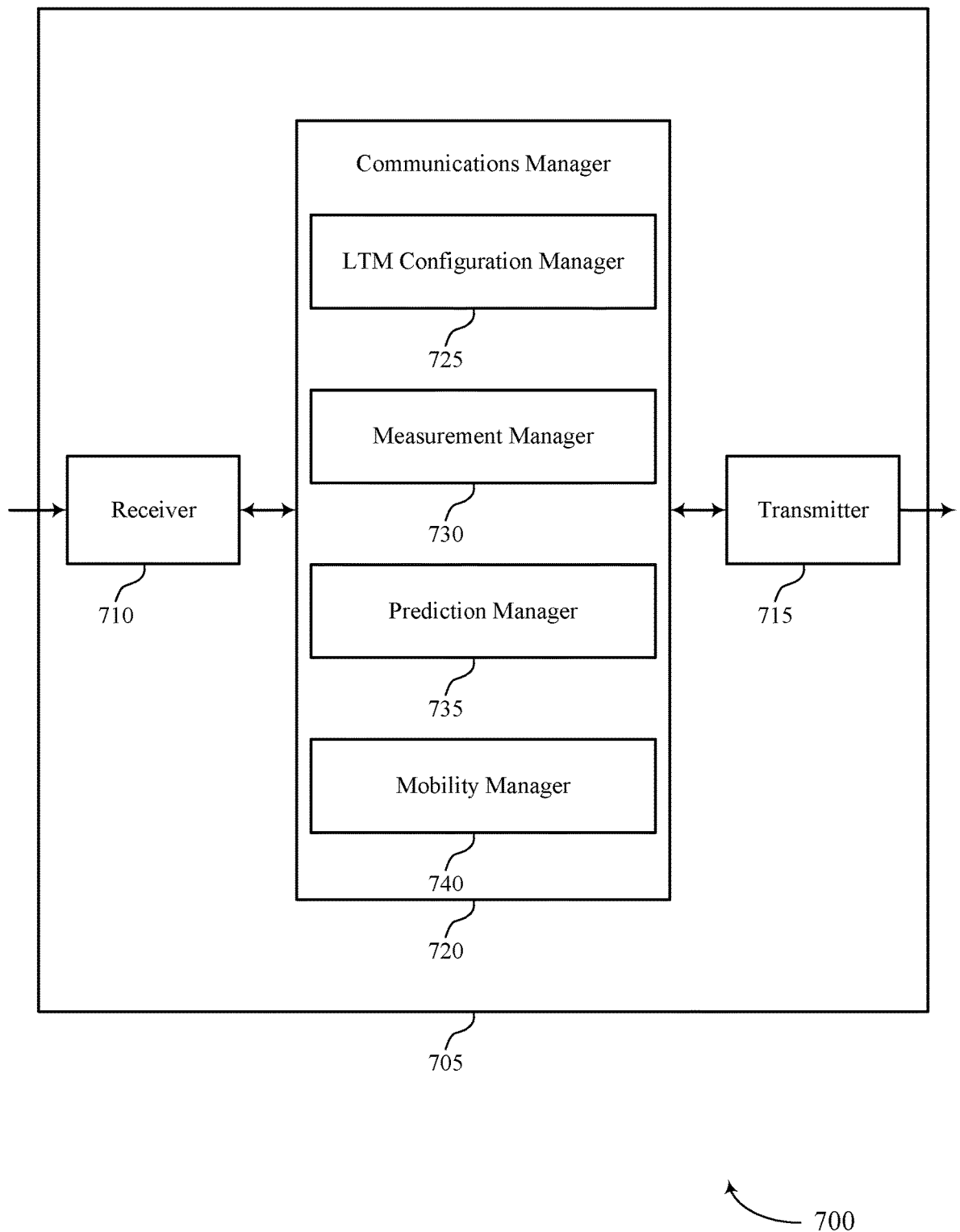

FIG. 7 shows a block diagram 700 of a device 705 that supports conditional cell selection based on beam prediction in accordance with one or more aspects of the present disclosure. The device 705 may be an example of aspects of a device 605 or a UE 115 as described herein. The device 705 may include a receiver 710, a transmitter 715, and a communications manager 720. The device 705, or one or more components of the device 705 (e.g., the receiver 710, the transmitter 715, and the communications manager 720), may include at least one processor, which may be coupled with at least one memory, to support the described techniques. Each of these components may be in communication with one another (e.g., via one or more buses).

The receiver 710 may provide a means for receiving information such as packets, user data, control information, or any combination thereof associated with various information channels (e.g., control channels, data channels, information channels related to conditional cell selection based on beam prediction). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to conditional cell selection based on beam prediction). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of conditional cell selection based on beam prediction as described herein. For example, the communications manager 720 may include an LTM configuration manager 725, a measurement manager 730, a prediction manager 735, a mobility manager 740, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications in accordance with examples as disclosed herein. The LTM configuration manager 725 is capable of, configured to, or operable to support a means for receiving configuration information for a set of beams of a set of multiple candidate cells that are to be measured for a lower-layer triggered mobility procedure, the configuration information including one or more parameters for prediction of one or more beam measurements for one or more beams of the set of beams. The measurement manager 730 is capable of, configured to, or operable to support a means for measuring a first subset of reference signals transmitted using a first subset of the set of beams to obtain a first subset of beam metrics. The prediction manager 735 is capable of, configured to, or operable to support a means for predicting, based on the configuration information, a second subset of beam metrics for a second subset of the set of beams, the second subset of beams including different beams than the first subset of the set of beams. The mobility manager 740 is capable of, configured to, or operable to support a means for initiating the lower-layer triggered mobility procedure based on the second subset of beam metrics.

Figure 8:
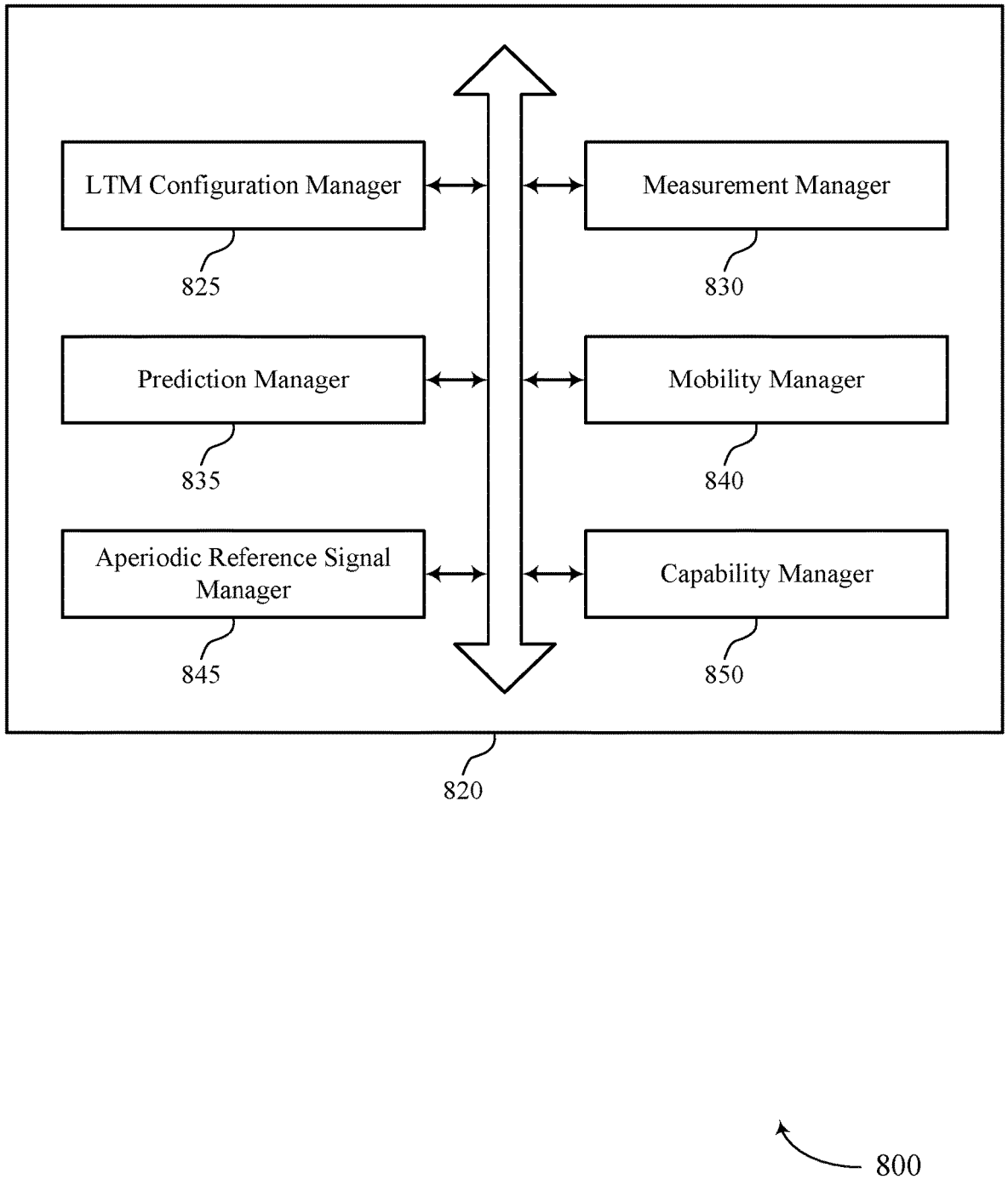
FIG. 8 shows a block diagram of a communications manager that supports conditional cell selection based on beam prediction in accordance with one or more aspects of the present disclosure.

FIG. 8 shows a block diagram 800 of a communications manager 820 that supports conditional cell selection based on beam prediction in accordance with one or more aspects of the present disclosure. The communications manager 820 may be an example of aspects of a communications manager 620, a communications manager 720, or both, as described herein. The communications manager 820, or various components thereof, may be an example of means for performing various aspects of conditional cell selection based on beam prediction as described herein. For example, the communications manager 820 may include an LTM configuration manager 825, a measurement manager 830, a prediction manager 835, a mobility manager 840, an aperiodic reference signal manager 845, a capability manager 850, or any combination thereof. Each of these components, or components or subcomponents thereof (e.g., one or more processors, one or more memories), may communicate, directly or indirectly, with one another (e.g., via one or more buses).

The communications manager 820 may support wireless communications in accordance with examples as disclosed herein. The LTM configuration manager 825 is capable of, configured to, or operable to support a means for receiving configuration information for a set of beams of a set of multiple candidate cells that are to be measured for a lower-layer triggered mobility procedure, the configuration information including one or more parameters for prediction of one or more beam measurements for one or more beams of the set of beams. The measurement manager 830 is capable of, configured to, or operable to support a means for measuring a first subset of reference signals transmitted using a first subset of the set of beams to obtain a first subset of beam metrics. The prediction manager 835 is capable of, configured to, or operable to support a means for predicting, based on the configuration information, a second subset of beam metrics for a second subset of the set of beams, the second subset of beams including different beams than the first subset of the set of beams. The mobility manager 840 is capable of, configured to, or operable to support a means for initiating the lower-layer triggered mobility procedure based on the second subset of beam metrics.

In some examples, to support predicting, the prediction manager 835 is capable of, configured to, or operable to support a means for configuring a separate machine learning module for each cell of the set of multiple candidate cells, or one machine learning module for two or more candidate cells of the set of multiple candidate cells. In some examples, to support predicting, the prediction manager 835 is capable of, configured to, or operable to support a means for obtaining an output from one or more machine learning modules that provides the second subset of beam metrics.

In some examples, to support predicting, the prediction manager 835 is capable of, configured to, or operable to support a means for providing one or more channel measurements from one or more of a serving cell or one or more of the first subset of beam metrics as an input to the one or more machine learning modules, and where the output from the one or more machine learning modules further includes a confidence value associated with each predicted beam metric.

In some examples, to support initiating the lower-layer triggered mobility procedure, the prediction manager 835 is capable of, configured to, or operable to support a means for determining that at least a first beam metric of the second subset of beam metrics has an associated confidence level that exceeds a confidence threshold. In some examples, to support initiating the lower-layer triggered mobility procedure, the mobility manager 840 is capable of, configured to, or operable to support a means for triggering the lower-layer triggered mobility procedure based on the determining.

In some examples, to support initiating the lower-layer triggered mobility procedure, the mobility manager 840 is capable of, configured to, or operable to support a means for transmitting an uplink communication to a target cell associated with the first beam metric to autonomously switch the target cell to be a primary cell.

In some examples, to support initiating the lower-layer triggered mobility procedure, the mobility manager 840 is capable of, configured to, or operable to support a means for transmitting a mobility request to a source cell that indicates a target cell associated with the first beam metric. In some examples, to support initiating the lower-layer triggered mobility procedure, the mobility manager 840 is capable of, configured to, or operable to support a means for receiving a confirmation to switch the target cell to be a primary cell.

In some examples, to support initiating the lower-layer triggered mobility procedure, the aperiodic reference signal manager 845 is capable of, configured to, or operable to support a means for transmitting an event triggered report to a serving cell based on one or more beam metrics of the second subset of beam metrics satisfying a condition to trigger additional reference signal transmissions.

In some examples, the condition to trigger additional reference signal transmissions is a predicted reference signal received power (RSRP) that is above a RSRP threshold value and a confidence that is below a confidence threshold value. In some examples, the event triggered report triggers transmission of an on-demand aperiodic reference signal transmission on a least one beam of the second subset of beams, and where cell selection is based on a measurement of the on-demand aperiodic reference signal.

In some examples, the measurement manager 830 is capable of, configured to, or operable to support a means for transmitting a measurement report to a serving cell that includes the first subset of beam metrics and the second subset of beam metrics. In some examples, the LTM configuration manager 825 is capable of, configured to, or operable to support a means for receiving updated configuration information that includes one or more updated parameters for prediction of one or more beam measurements for one or more beams of the set of beams.

In some examples, to support initiating the lower-layer triggered mobility procedure, the measurement manager 830 is capable of, configured to, or operable to support a means for transmitting a lower-layer triggered mobility beam report that includes the second subset of beam metrics and a confidence level associated with each predicted beam metric of the second subset of beam metrics. In some examples, the lower-layer triggered mobility beam report further includes one or more of an indication for each reported beam metric that indicates whether the associated beam metric is a measured metric or a predicted metric, or a time step for each predicted metric, and where each reported beam metric is a layer-one (L1) or a layer-three (L3) metric.

In some examples, the capability manager 850 is capable of, configured to, or operable to support a means for transmitting a capability indication to a network entity that indicates a capability of the UE to perform beam metric prediction for one or more candidate cells as part of the lower-layer triggered mobility procedure.

Figure 9:
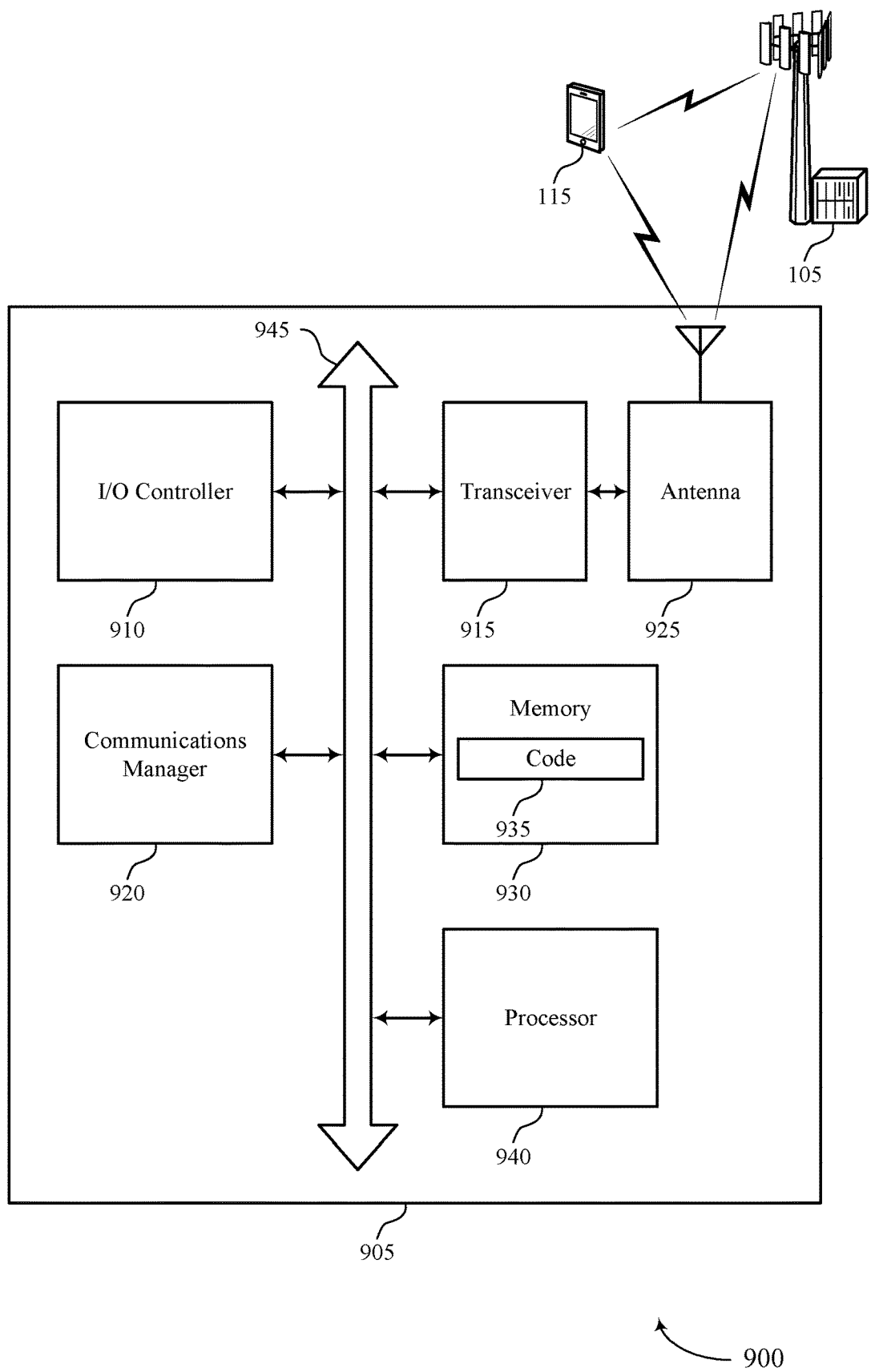
FIG. 9 shows a diagram of a system including a device that supports conditional cell selection based on beam prediction in accordance with one or more aspects of the present disclosure.

FIG. 9 shows a diagram of a system 900 including a device 905 that supports conditional cell selection based on beam prediction in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, at least one memory 930, code 935, and at least one processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of one or more processors, such as the at least one processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The at least one memory 930 may include random access memory (RAM) and read-only memory (ROM). The at least one memory 930 may store computer-readable, computer-executable code 935 including instructions that, when executed by the at least one processor 940, cause the device 905 to perform various functions described herein. The code 935 may be stored in a non-transitory computer-readable medium such as system memory or another type of memory. In some cases, the code 935 may not be directly executable by the at least one processor 940 but may cause a computer (e.g., when compiled and executed) to perform functions described herein. In some cases, the at least one memory 930 may contain, among other things, a basic I/O system (BIOS) which may control basic hardware or software operation such as the interaction with peripheral components or devices.

The at least one processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 940 may be configured to operate a memory array using a memory controller. In some other cases, a memory controller may be integrated into the at least one processor 940. The at least one processor 940 may be configured to execute computer-readable instructions stored in a memory (e.g., the at least one memory 930) to cause the device 905 to perform various functions (e.g., functions or tasks supporting conditional cell selection based on beam prediction). For example, the device 905 or a component of the device 905 may include at least one processor 940 and at least one memory 930 coupled with or to the at least one processor 940, the at least one processor 940 and at least one memory 930 configured to perform various functions described herein. In some examples, the at least one processor 940 may include multiple processors and the at least one memory 930 may include multiple memories. One or more of the multiple processors may be coupled with one or more of the multiple memories, which may, individually or collectively, be configured to perform various functions herein. In some examples, the at least one processor 940 may be a component of a processing system, which may refer to a system (such as a series) of machines, circuitry (including, for example, one or both of processor circuitry (which may include the at least one processor 940) and memory circuitry (which may include the at least one memory 930)), or components, that receives or obtains inputs and processes the inputs to produce, generate, or obtain a set of outputs. The processing system may be configured to perform one or more of the functions described herein. As such, the at least one processor 940 or a processing system including the at least one processor 940 may be configured to, configurable to, or operable to cause the device 905 to perform one or more of the functions described herein. Further, as described herein, being "configured to," being "configurable to," and being "operable to" may be used interchangeably and may be associated with a capability, when executing code stored in the at least one memory 930 or otherwise, to perform one or more of the functions described herein.

The communications manager 920 may support wireless communications in accordance with examples as disclosed herein. For example, the communications manager 920 is capable of, configured to, or operable to support a means for receiving configuration information for a set of beams of a set of multiple candidate cells that are to be measured for a lower-layer triggered mobility procedure, the configuration information including one or more parameters for prediction of one or more beam measurements for one or more beams of the set of beams. The communications manager 920 is capable of, configured to, or operable to support a means for measuring a first subset of reference signals transmitted using a first subset of the set of beams to obtain a first subset of beam metrics. The communications manager 920 is capable of, configured to, or operable to support a means for predicting, based on the configuration information, a second subset of beam metrics for a second subset of the set of beams, the second subset of beams including different beams than the first subset of the set of beams. The communications manager 920 is capable of, configured to, or operable to support a means for initiating the lower-layer triggered mobility procedure based on the second subset of beam metrics.

By including or configuring the communications manager 920 in accordance with examples as described herein, the device 905 may support techniques for lower-layer triggered mobility that may provide efficient cell switching for a UE that may enhance reliability and efficiency of communications, and provide for reduced power consumption.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the at least one processor 940, the at least one memory 930, the code 935, or any combination thereof. For example, the code 935 may include instructions executable by the at least one processor 940 to cause the device 905 to perform various aspects of conditional cell selection based on beam prediction as described herein, or the at least one processor 940 and the at least one memory 930 may be otherwise configured to, individually or collectively, perform or support such operations.

Figure 10:
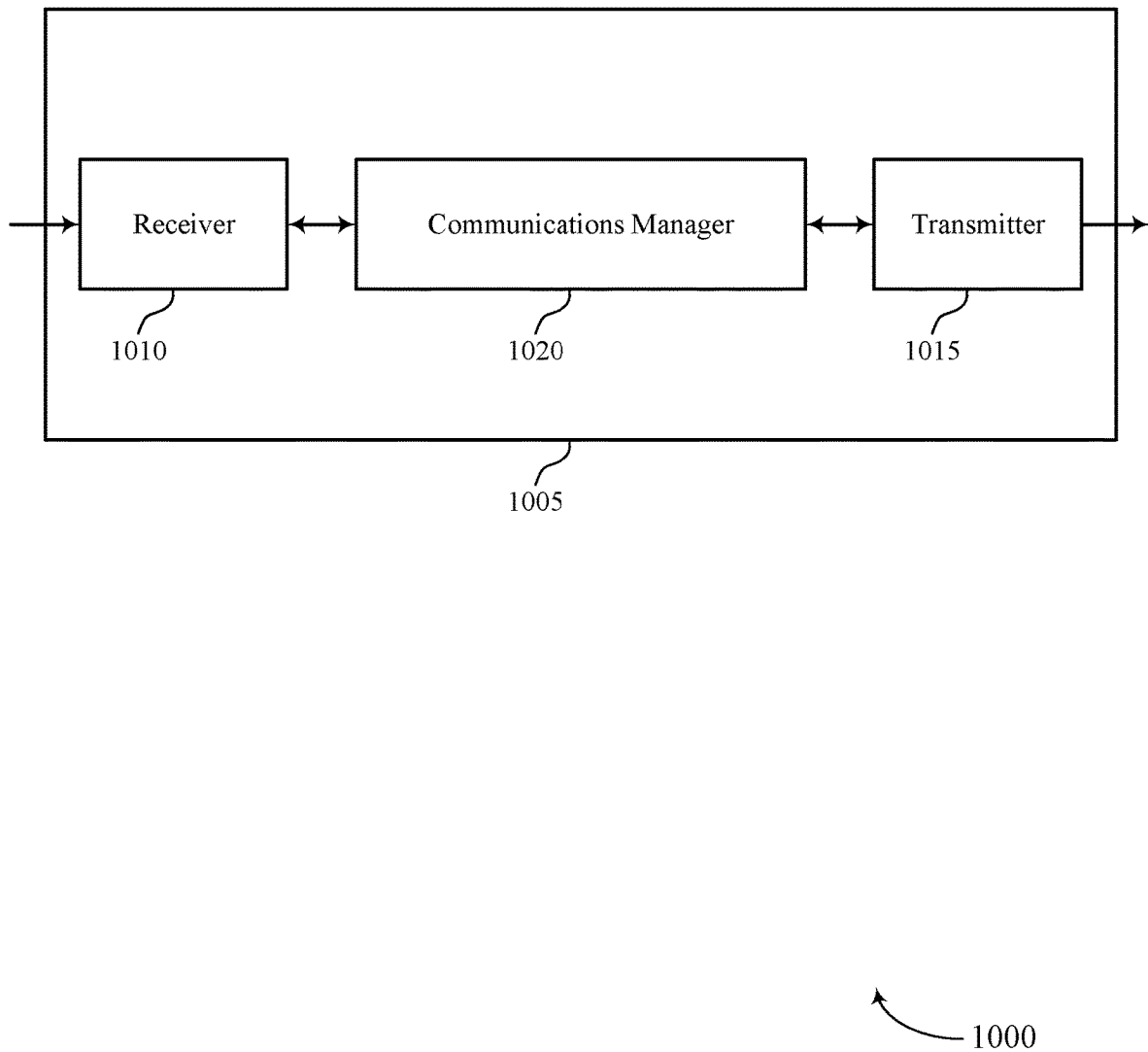
FIGS. 10 and 11 show block diagrams of devices that support conditional cell selection based on beam prediction in accordance with one or more aspects of the present disclosure.

FIG. 10 shows a block diagram 1000 of a device 1005 that supports conditional cell selection based on beam prediction in accordance with one or more aspects of the present disclosure. The device 1005 may be an example of aspects of a network entity 105 as described herein. The device 1005 may include a receiver 1010, a transmitter 1015, and a communications manager 1020. The device 1005, or one or more components of the device 1005 (e.g., the receiver 1010, the transmitter 1015, and the communications manager 1020), may include at least one processor, which may be coupled with at least one memory, to, individually or collectively, support or enable the described techniques. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of conditional cell selection based on beam prediction as described herein. For example, the communications manager 1020, the receiver 1010, the transmitter 1015, or various combinations or components thereof may be capable of performing one or more of the functions described herein.

In some examples, the communications manager 1020, the receiver 1010, the transmitter 1015, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1020, the receiver 1010, the transmitter 1015, or various combinations or components thereof may be implemented in code (e.g., as communications management software or firmware) executed by at least one processor. If implemented in code executed by at least one processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications in accordance with examples as disclosed herein. For example, the communications manager 1020 is capable of, configured to, or operable to support a means for transmitting, to a UE, configuration information for a set of beams of a set of multiple candidate cells that are to be measured for a lower-layer triggered mobility procedure, the configuration information including one or more parameters for prediction of one or more beam measurements for one or more beams of the set of beams. The communications manager 1020 is capable of, configured to, or operable to support a means for receiving, from the UE, an indication of one or more predicted beam metrics that satisfy a condition associated with the one or more parameters provided with the configuration information. The communications manager 1020 is capable of, configured to, or operable to support a means for initiating the lower-layer triggered mobility procedure based on the received indication.

By including or configuring the communications manager 1020 in accordance with examples as described herein, the device 1005 (e.g., at least one processor controlling or otherwise coupled with the receiver 1010, the transmitter 1015, the communications manager 1020, or a combination thereof) may support techniques for lower-layer triggered mobility that may provide efficient cell switching for a UE that may enhance reliability and efficiency of communications, and provide for reduced power consumption.

Figure 11:
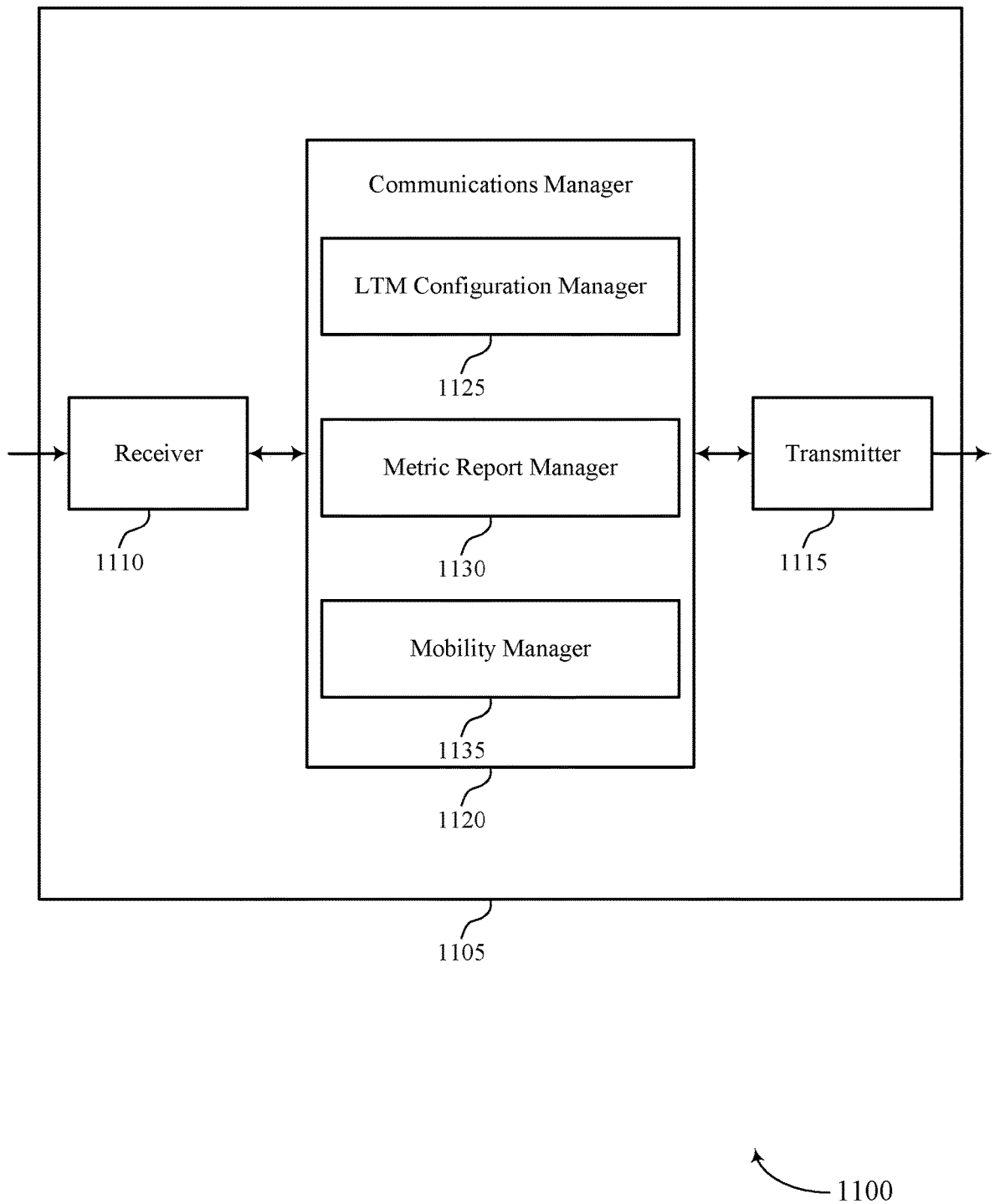

FIG. 11 shows a block diagram 1100 of a device 1105 that supports conditional cell selection based on beam prediction in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105, or one of more components of the device 1105 (e.g., the receiver 1110, the transmitter 1115, and the communications manager 1120), may include at least one processor, which may be coupled with at least one memory, to support the described techniques. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of conditional cell selection based on beam prediction as described herein. For example, the communications manager 1120 may include an LTM configuration manager 1125, a metric report manager 1130, a mobility manager 1135, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications in accordance with examples as disclosed herein. The LTM configuration manager 1125 is capable of, configured to, or operable to support a means for transmitting, to a UE, configuration information for a set of beams of a set of multiple candidate cells that are to be measured for a lower-layer triggered mobility procedure, the configuration information including one or more parameters for prediction of one or more beam measurements for one or more beams of the set of beams. The metric report manager 1130 is capable of, configured to, or operable to support a means for receiving, from the UE, an indication of one or more predicted beam metrics that satisfy a condition associated with the one or more parameters provided with the configuration information. The mobility manager 1135 is capable of, configured to, or operable to support a means for initiating the lower-layer triggered mobility procedure based on the received indication.

Figure 12:
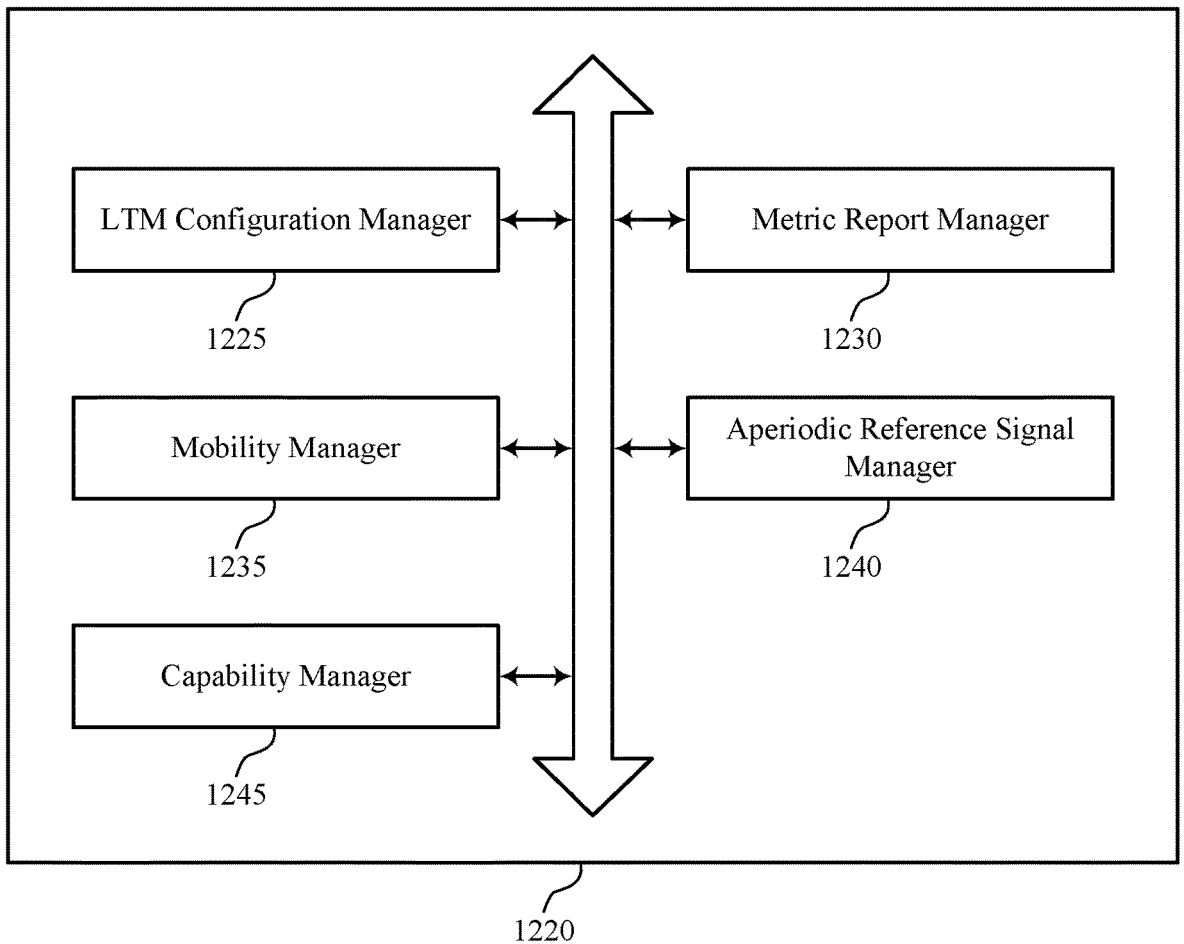
FIG. 12 shows a block diagram of a communications manager that supports conditional cell selection based on beam prediction in accordance with one or more aspects of the present disclosure.

FIG. 12 shows a block diagram 1200 of a communications manager 1220 that supports conditional cell selection based on beam prediction in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of conditional cell selection based on beam prediction as described herein. For example, the communications manager 1220 may include an LTM configuration manager 1225, a metric report manager 1230, a mobility manager 1235, an aperiodic reference signal manager 1240, a capability manager 1245, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communications in accordance with examples as disclosed herein. The LTM configuration manager 1225 is capable of, configured to, or operable to support a means for transmitting, to a UE, configuration information for a set of beams of a set of multiple candidate cells that are to be measured for a lower-layer triggered mobility procedure, the configuration information including one or more parameters for prediction of one or more beam measurements for one or more beams of the set of beams. The metric report manager 1230 is capable of, configured to, or operable to support a means for receiving, from the UE, an indication of one or more predicted beam metrics that satisfy a condition associated with the one or more parameters provided with the configuration information. The mobility manager 1235 is capable of, configured to, or operable to support a means for initiating the lower-layer triggered mobility procedure based on the received indication.

In some examples, the configuration information indicates a configuration for a separate machine learning module for each cell of the set of multiple candidate cells, or one machine learning module for two or more candidate cells of the set of multiple candidate cells. In some examples, one or more channel measurements from one or more of a serving cell or one or more measured beam metrics on one or more of the candidate cells are provided as an input to the one or more machine learning modules, and where an output from the one or more machine learning modules includes a confidence value associated with each predicted beam metric.

In some examples, to support initiating the lower-layer triggered mobility procedure, the mobility manager 1235 is capable of, configured to, or operable to support a means for determining that at least a first predicted beam metric has an associated confidence level that exceeds a confidence threshold. In some examples, to support initiating the lower-layer triggered mobility procedure, the mobility manager 1235 is capable of, configured to, or operable to support a means for triggering a switch of the UE from a source cell to a target cell associated with the first predicted beam metric based on the determining. In some examples, the UE transmits an uplink communication to a target cell associated with a predicted beam metric to autonomously switch a target cell to be a primary cell.

In some examples, the mobility manager 1235 is capable of, configured to, or operable to support a means for receiving, from the UE, a mobility request that indicates a target cell associated with a first beam metric. In some examples, the mobility manager 1235 is capable of, configured to, or operable to support a means for transmitting a confirmation to the UE to switch the target cell to be a primary cell.

In some examples, to support receiving the indication of one or more predicted beam metrics, the aperiodic reference signal manager 1240 is capable of, configured to, or operable to support a means for receiving, from the UE, an event triggered report that indicates one or more predicted beam metrics satisfies a condition to trigger additional reference signal transmissions. In some examples, the condition to trigger additional reference signal transmissions is a predicted reference signal received power (RSRP) that is above a RSRP threshold value and a confidence that is below a confidence threshold value.

In some examples, the aperiodic reference signal manager 1240 is capable of, configured to, or operable to support a means for transmitting an indication to one or more of the candidate cells to trigger an on-demand aperiodic reference signal transmission on a least one beam of the one or more candidate cells, and where cell selection is based on a measurement at the UE of the on-demand aperiodic reference signal.

In some examples, the receiving the indication of one or more predicted beam metrics includes receiving a measurement report from the UE that includes a first subset of beam metrics that are measured beam metrics and a second subset of beam metrics that are predicted beam metrics, and the LTM configuration manager 1225 is capable of, configured to, or operable to support a means for transmitting, to the UE, updated configuration information that includes one or more updated parameters for prediction of one or more beam measurements for one or more beams of the set of beams.

In some examples, to support receiving the indication of one or more predicted beam metrics, the metric report manager 1230 is capable of, configured to, or operable to support a means for receiving, from the UE, a lower-layer triggered mobility beam report that includes a first subset of measured beam metrics, a second subset of predicted beam metrics, and a confidence level associated with each predicted beam metric of the second subset of beam predicted metrics. In some examples, the lower-layer triggered mobility beam report further includes one or more of an indication for each reported beam metric that indicates whether the associated beam metric is a measured metric or a predicted metric, or a time step for each predicted metric, and where each reported beam metric is a layer-one (L1) or a layer-three (L3) metric.

In some examples, the capability manager 1245 is capable of, configured to, or operable to support a means for receiving, from the UE, a capability indication to a network entity that indicates a capability of the UE to perform beam metric prediction for one or more candidate cells as part of the lower-layer triggered mobility procedure, and where the configuration information is based on the capability indication.

Figure 13:
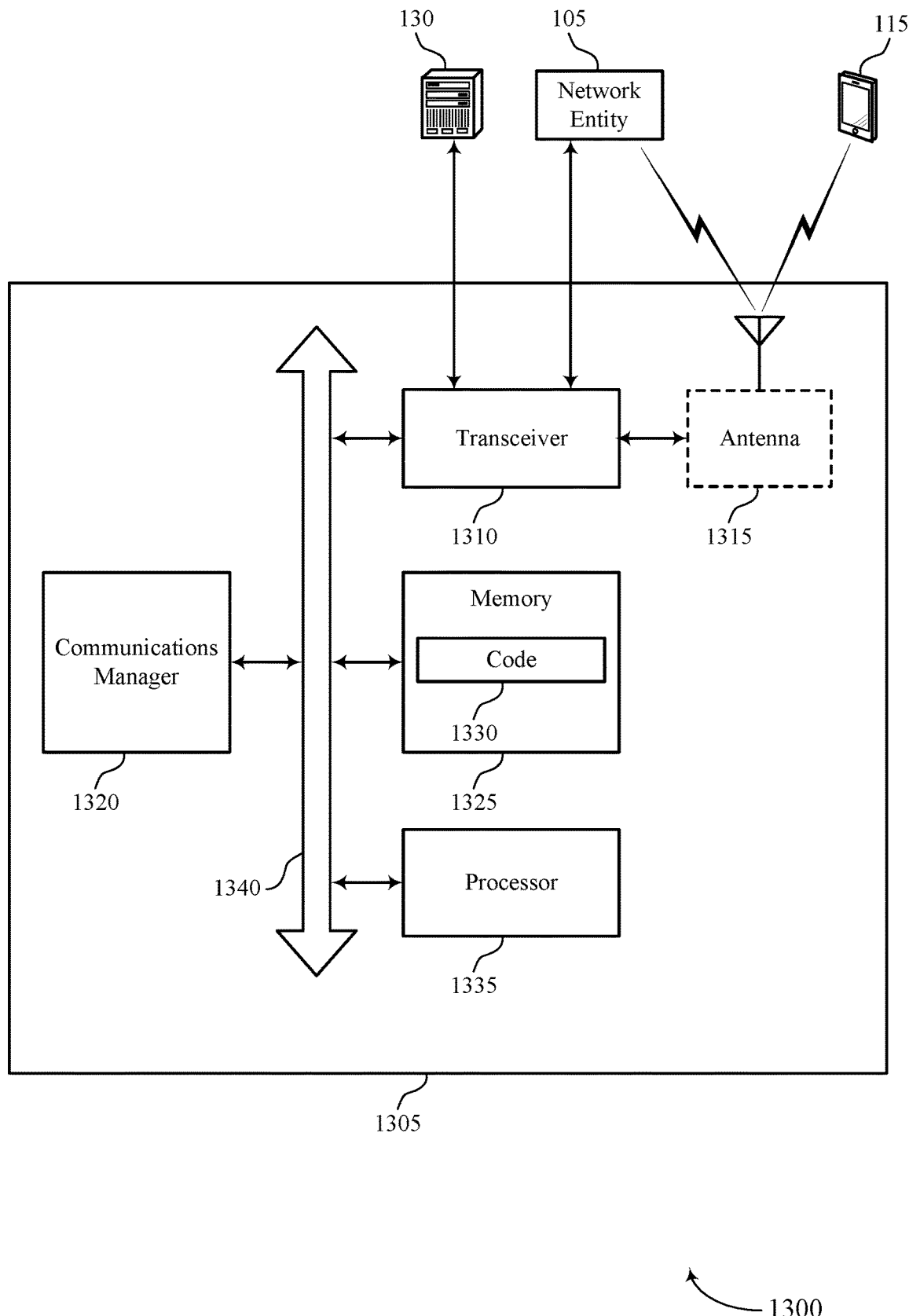
FIG. 13 shows a diagram of a system including a device that supports conditional cell selection based on beam prediction in accordance with one or more aspects of the present disclosure.

FIG. 13 shows a diagram of a system 1300 including a device 1305 that supports conditional cell selection based on beam prediction in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, at least one memory 1325, code 1330, and at least one processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or one or more memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or one or more memory components (e.g., the at least one processor 1335, the at least one memory 1325, or both), may be included in a chip or chip assembly that is installed in the device 1305. In some examples, the transceiver 1310 may be operable to support communications via one or more communications links (e.g., a communication link 125, a backhaul communication link 120, a midhaul communication link 162, a fronthaul communication link 168).

The at least one memory 1325 may include RAM, ROM, or any combination thereof. The at least one memory 1325 may store computer-readable, computer-executable code 1330 including instructions that, when executed by one or more of the at least one processor 1335, cause the device 1305 to perform various functions described herein. The code 1330 may be stored in a non-transitory computer-readable medium such as system memory or another type of memory. In some cases, the code 1330 may not be directly executable by a processor of the at least one processor 1335 but may cause a computer (e.g., when compiled and executed) to perform functions described herein. In some cases, the at least one memory 1325 may contain, among other things, a BIOS which may control basic hardware or software operation such as the interaction with peripheral components or devices. In some examples, the at least one processor 1335 may include multiple processors and the at least one memory 1325 may include multiple memories. One or more of the multiple processors may be coupled with one or more of the multiple memories which may, individually or collectively, be configured to perform various functions herein (for example, as part of a processing system).

The at least one processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1335 may be configured to operate a memory array using a memory controller. In some other cases, a memory controller may be integrated into one or more of the at least one processor 1335. The at least one processor 1335 may be configured to execute computer-readable instructions stored in a memory (e.g., one or more of the at least one memory 1325) to cause the device 1305 to perform various functions (e.g., functions or tasks supporting conditional cell selection based on beam prediction). For example, the device 1305 or a component of the device 1305 may include at least one processor 1335 and at least one memory 1325 coupled with one or more of the at least one processor 1335, the at least one processor 1335 and the at least one memory 1325 configured to perform various functions described herein. The at least one processor 1335 may be an example of a cloud-computing platform (e.g., one or more physical nodes and supporting software such as operating systems, virtual machines, or container instances) that may host the functions (e.g., by executing code 1330) to perform the functions of the device 1305. The at least one processor 1335 may be any one or more suitable processors capable of executing scripts or instructions of one or more software programs stored in the device 1305 (such as within one or more of the at least one memory 1325). In some examples, the at least one processor 1335 may include multiple processors and the at least one memory 1325 may include multiple memories. One or more of the multiple processors may be coupled with one or more of the multiple memories, which may, individually or collectively, be configured to perform various functions herein. In some examples, the at least one processor 1335 may be a component of a processing system, which may refer to a system (such as a series) of machines, circuitry (including, for example, one or both of processor circuitry (which may include the at least one processor 1335) and memory circuitry (which may include the at least one memory 1325)), or components, that receives or obtains inputs and processes the inputs to produce, generate, or obtain a set of outputs. The processing system may be configured to perform one or more of the functions described herein. As such, the at least one processor 1335 or a processing system including the at least one processor 1335 may be configured to, configurable to, or operable to cause the device 1305 to perform one or more of the functions described herein. Further, as described herein, being "configured to," being "configurable to," and being "operable to" may be used interchangeably and may be associated with a capability, when executing code stored in the at least one memory 1325 or otherwise, to perform one or more of the functions described herein.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the at least one memory 1325, the code 1330, and the at least one processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communications in accordance with examples as disclosed herein. For example, the communications manager 1320 is capable of, configured to, or operable to support a means for transmitting, to a UE, configuration information for a set of beams of a set of multiple candidate cells that are to be measured for a lower-layer triggered mobility procedure, the configuration information including one or more parameters for prediction of one or more beam measurements for one or more beams of the set of beams. The communications manager 1320 is capable of, configured to, or operable to support a means for receiving, from the UE, an indication of one or more predicted beam metrics that satisfy a condition associated with the one or more parameters provided with the configuration information. The communications manager 1320 is capable of, configured to, or operable to support a means for initiating the lower-layer triggered mobility procedure based on the received indication.

By including or configuring the communications manager 1320 in accordance with examples as described herein, the device 1305 may support techniques for lower-layer triggered mobility that may provide efficient cell switching for a UE that may enhance reliability and efficiency of communications, and provide for reduced power consumption.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, one or more of the at least one processor 1335, one or more of the at least one memory 1325, the code 1330, or any combination thereof (for example, by a processing system including at least a portion of the at least one processor 1335, the at least one memory 1325, the code 1330, or any combination thereof). For example, the code 1330 may include instructions executable by one or more of the at least one processor 1335 to cause the device 1305 to perform various aspects of conditional cell selection based on beam prediction as described herein, or the at least one processor 1335 and the at least one memory 1325 may be otherwise configured to, individually or collectively, perform or support such operations.

Figure 14:
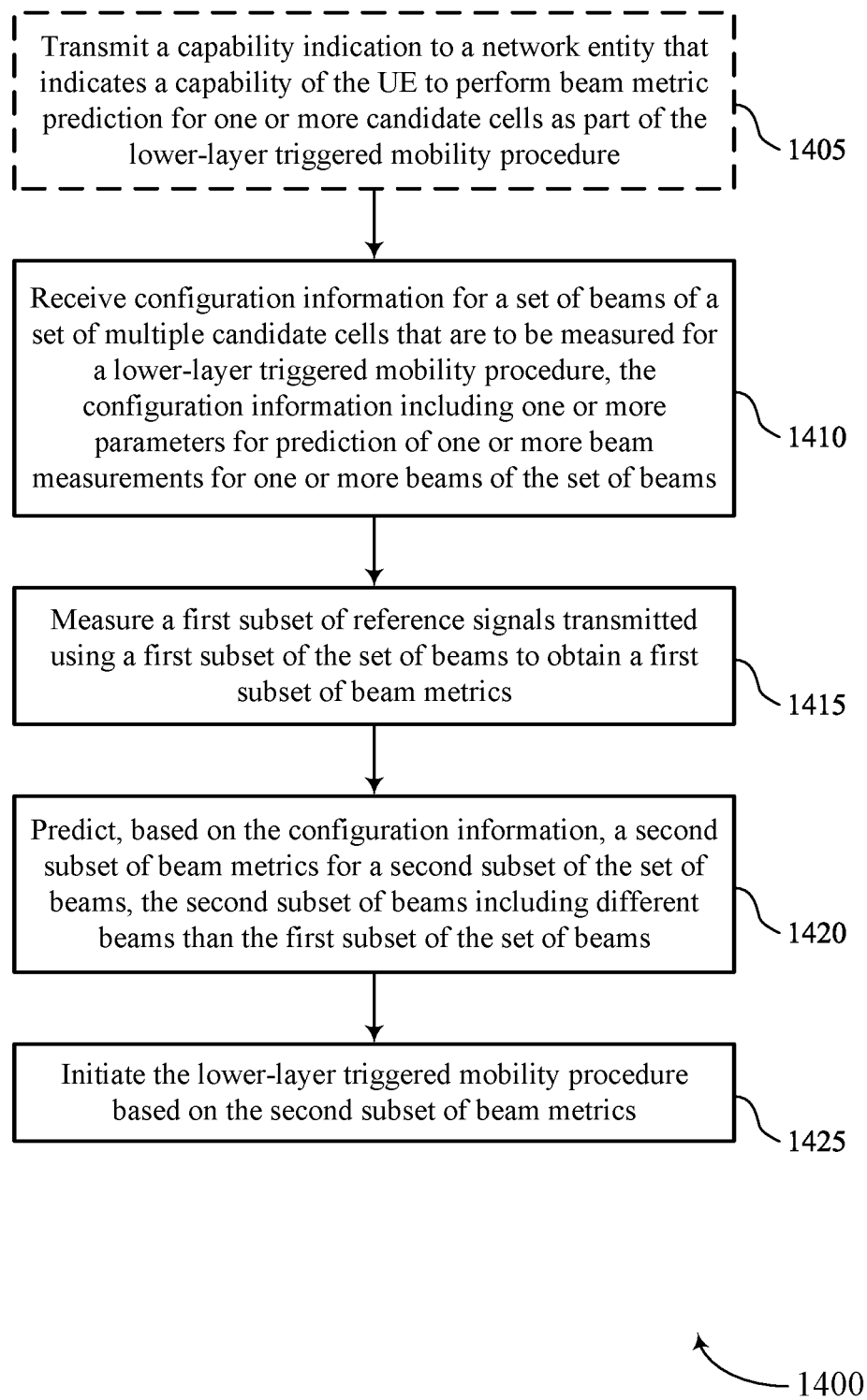
FIGS. 14 through 24 show flowcharts illustrating methods that support conditional cell selection based on beam prediction in accordance with one or more aspects of the present disclosure.

FIG. 14 shows a flowchart illustrating a method 1400 that supports conditional cell selection based on beam prediction in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

Optionally, at 1405, the method may include transmitting a capability indication to a network entity that indicates a capability of the UE to perform beam metric prediction for one or more candidate cells as part of the lower-layer triggered mobility procedure. The operations of block 1405 may be performed in accordance with examples as disclosed herein. In some examples, aspects of the operations of 1405 may be performed by a capability manager 850 as described with reference to FIG. 8.

At 1410, the method may include receiving configuration information for a set of beams of a set of multiple candidate cells that are to be measured for a lower-layer triggered mobility procedure, the configuration information including one or more parameters for prediction of one or more beam measurements for one or more beams of the set of beams. The operations of block 1410 may be performed in accordance with examples as disclosed herein. In some examples, aspects of the operations of 1410 may be performed by an LTM configuration manager 825 as described with reference to FIG. 8.

At 1415, the method may include measuring a first subset of reference signals transmitted using a first subset of the set of beams to obtain a first subset of beam metrics. The operations of block 1415 may be performed in accordance with examples as disclosed herein. In some examples, aspects of the operations of 1415 may be performed by a measurement manager 830 as described with reference to FIG. 8.

At 1420, the method may include predicting, based on the configuration information, a second subset of beam metrics for a second subset of the set of beams, the second subset of beams including different beams than the first subset of the set of beams. The operations of block 1420 may be performed in accordance with examples as disclosed herein. In some examples, aspects of the operations of 1420 may be performed by a prediction manager 835 as described with reference to FIG. 8.

At 1425, the method may include initiating the lower-layer triggered mobility procedure based on the second subset of beam metrics. The operations of block 1425 may be performed in accordance with examples as disclosed herein. In some examples, aspects of the operations of 1425 may be performed by a mobility manager 840 as described with reference to FIG. 8.

Figure 15:
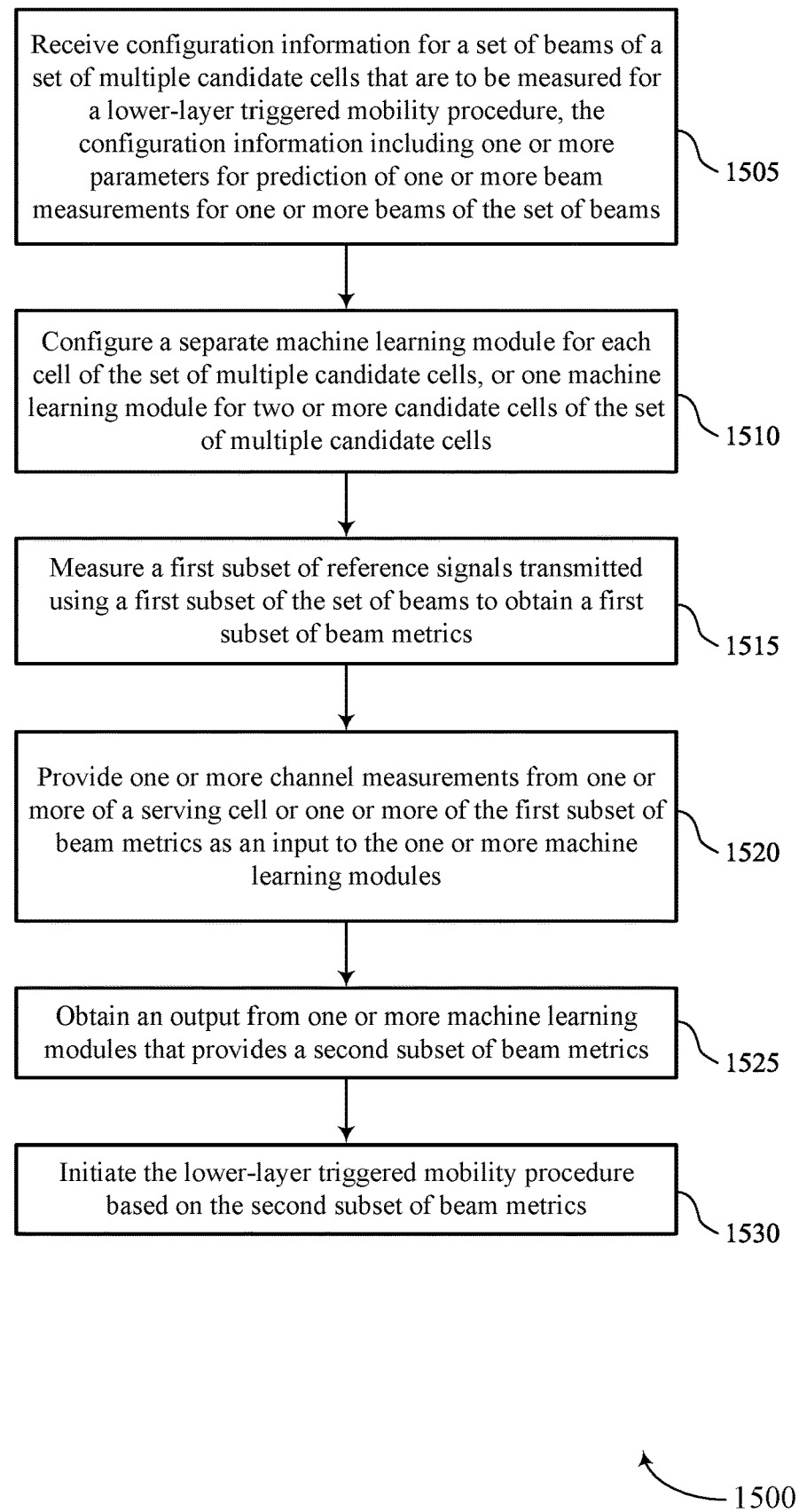

FIG. 15 shows a flowchart illustrating a method 1500 that supports conditional cell selection based on beam prediction in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include receiving configuration information for a set of beams of a set of multiple candidate cells that are to be measured for a lower-layer triggered mobility procedure, the configuration information including one or more parameters for prediction of one or more beam measurements for one or more beams of the set of beams. The operations of block 1505 may be performed in accordance with examples as disclosed herein. In some examples, aspects of the operations of 1505 may be performed by an LTM configuration manager 825 as described with reference to FIG. 8.

At 1510, the method may include configuring a separate machine learning module for each cell of the set of multiple candidate cells, or one machine learning module for two or more candidate cells of the set of multiple candidate cells. The operations of block 1510 may be performed in accordance with examples as disclosed herein. In some examples, aspects of the operations of 1510 may be performed by a prediction manager 835 as described with reference to FIG. 8.

At 1515, the method may include measuring a first subset of reference signals transmitted using a first subset of the set of beams to obtain a first subset of beam metrics. The operations of block 1515 may be performed in accordance with examples as disclosed herein. In some examples, aspects of the operations of 1515 may be performed by a measurement manager 830 as described with reference to FIG. 8.

At 1520, the method may include providing one or more channel measurements from one or more of a serving cell or one or more of the first subset of beam metrics as an input to the one or more machine learning modules. The operations of block 1520 may be performed in accordance with examples as disclosed herein. In some examples, aspects of the operations of 1520 may be performed by a prediction manager 835 as described with reference to FIG. 8.

At 1525, the method may include obtaining an output from one or more machine learning modules that provides a second subset of beam metrics. The operations of block 1525 may be performed in accordance with examples as disclosed herein. In some examples, aspects of the operations of 1525 may be performed by a prediction manager 835 as described with reference to FIG. 8.

At 1530, the method may include initiating the lower-layer triggered mobility procedure based on the second subset of beam metrics. The operations of block 1530 may be performed in accordance with examples as disclosed herein. In some examples, aspects of the operations of 1530 may be performed by a mobility manager 840 as described with reference to FIG. 8.

Figure 16:
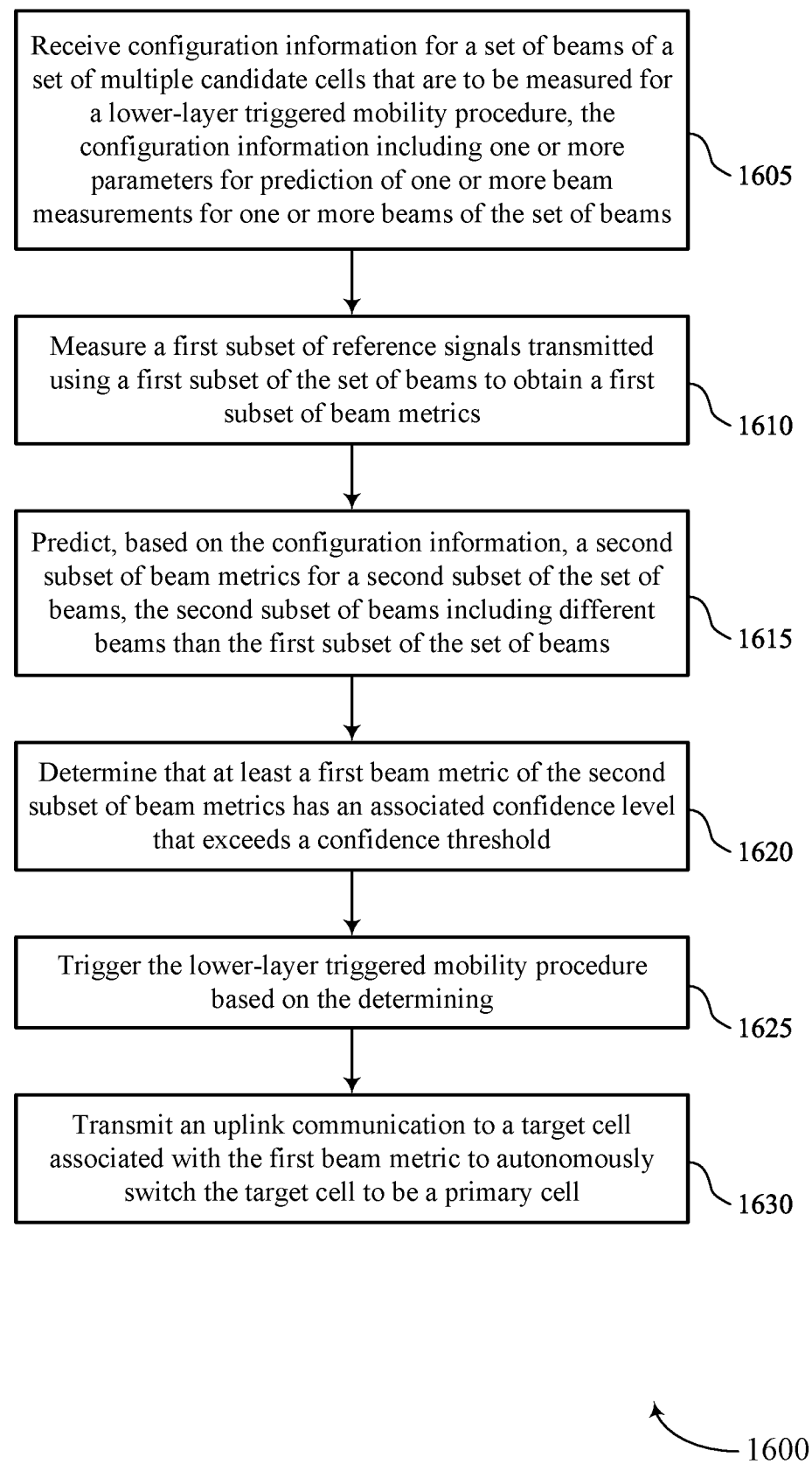

FIG. 16 shows a flowchart illustrating a method 1600 that supports conditional cell selection based on beam prediction in accordance with aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1605, the method may include receiving configuration information for a set of beams of a set of multiple candidate cells that are to be measured for a lower-layer triggered mobility procedure, the configuration information including one or more parameters for prediction of one or more beam measurements for one or more beams of the set of beams. The operations of block 1605 may be performed in accordance with examples as disclosed herein. In some examples, aspects of the operations of 1605 may be performed by an LTM configuration manager 825 as described with reference to FIG. 8.

At 1610, the method may include measuring a first subset of reference signals transmitted using a first subset of the set of beams to obtain a first subset of beam metrics. The operations of block 1610 may be performed in accordance with examples as disclosed herein. In some examples, aspects of the operations of 1610 may be performed by a measurement manager 830 as described with reference to FIG. 8.

At 1615, the method may include predicting, based on the configuration information, a second subset of beam metrics for a second subset of the set of beams, the second subset of beams including different beams than the first subset of the set of beams. The operations of block 1615 may be performed in accordance with examples as disclosed herein. In some examples, aspects of the operations of 1615 may be performed by a prediction manager 835 as described with reference to FIG. 8.

At 1620, the method may include determining that at least a first beam metric of the second subset of beam metrics has an associated confidence level that exceeds a confidence threshold. The operations of block 1620 may be performed in accordance with examples as disclosed herein. In some examples, aspects of the operations of 1620 may be performed by a prediction manager 835 as described with reference to FIG. 8.

At 1625, the method may include triggering the lower-layer triggered mobility procedure based on the determining. The operations of block 1625 may be performed in accordance with examples as disclosed herein. In some examples, aspects of the operations of 1625 may be performed by a mobility manager 840 as described with reference to FIG. 8.

At 1630, the method may include transmitting an uplink communication to a target cell associated with the first beam metric to autonomously switch the target cell to be a primary cell. The operations of block 1630 may be performed in accordance with examples as disclosed herein. In some examples, aspects of the operations of 1630 may be performed by a mobility manager 840 as described with reference to FIG. 8.

Figure 17:
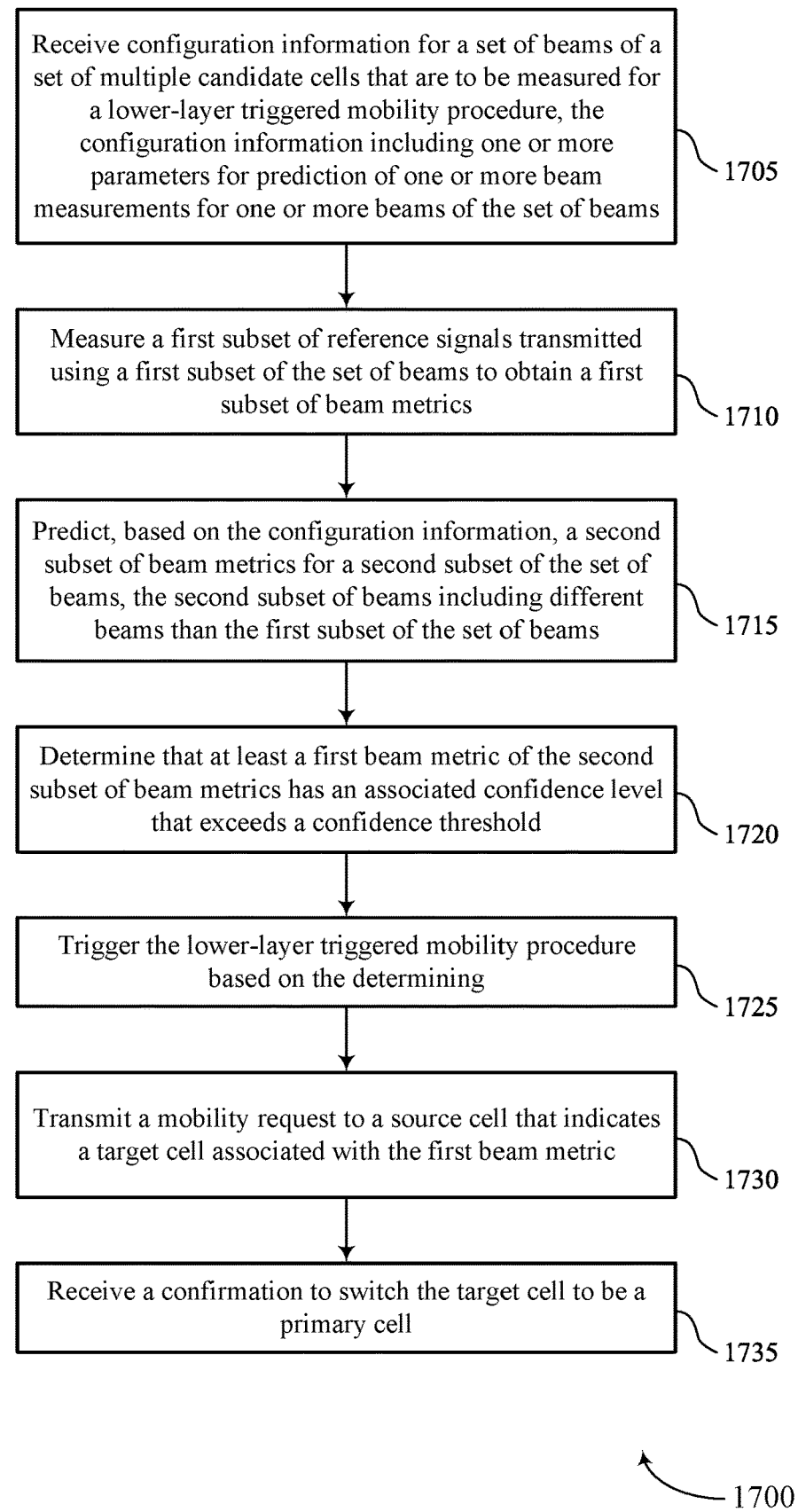

FIG. 17 shows a flowchart illustrating a method 1700 that supports conditional cell selection based on beam prediction in accordance with aspects of the present disclosure. The operations of the method 1700 may be implemented by a UE or its components as described herein. For example, the operations of the method 1700 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1705, the method may include receiving configuration information for a set of beams of a set of multiple candidate cells that are to be measured for a lower-layer triggered mobility procedure, the configuration information including one or more parameters for prediction of one or more beam measurements for one or more beams of the set of beams. The operations of block 1705 may be performed in accordance with examples as disclosed herein. In some examples, aspects of the operations of 1705 may be performed by an LTM configuration manager 825 as described with reference to FIG. 8.

At 1710, the method may include measuring a first subset of reference signals transmitted using a first subset of the set of beams to obtain a first subset of beam metrics. The operations of block 1710 may be performed in accordance with examples as disclosed herein. In some examples, aspects of the operations of 1710 may be performed by a measurement manager 830 as described with reference to FIG. 8.

At 1715, the method may include predicting, based on the configuration information, a second subset of beam metrics for a second subset of the set of beams, the second subset of beams including different beams than the first subset of the set of beams. The operations of block 1715 may be performed in accordance with examples as disclosed herein. In some examples, aspects of the operations of 1715 may be performed by a prediction manager 835 as described with reference to FIG. 8.

At 1720, the method may include determining that at least a first beam metric of the second subset of beam metrics has an associated confidence level that exceeds a confidence threshold. The operations of block 1720 may be performed in accordance with examples as disclosed herein. In some examples, aspects of the operations of 1720 may be performed by a prediction manager 835 as described with reference to FIG. 8.

At 1725, the method may include triggering the lower-layer triggered mobility procedure based on the determining. The operations of block 1725 may be performed in accordance with examples as disclosed herein. In some examples, aspects of the operations of 1725 may be performed by a mobility manager 840 as described with reference to FIG. 8.

At 1730, the method may include transmitting a mobility request to a source cell that indicates a target cell associated with the first beam metric. The operations of block 1730 may be performed in accordance with examples as disclosed herein. In some examples, aspects of the operations of 1730 may be performed by a mobility manager 840 as described with reference to FIG. 8.

At 1735, the method may include receiving a confirmation to switch the target cell to be a primary cell. The operations of block 1735 may be performed in accordance with examples as disclosed herein. In some examples, aspects of the operations of 1735 may be performed by a mobility manager 840 as described with reference to FIG. 8.

Figure 18:
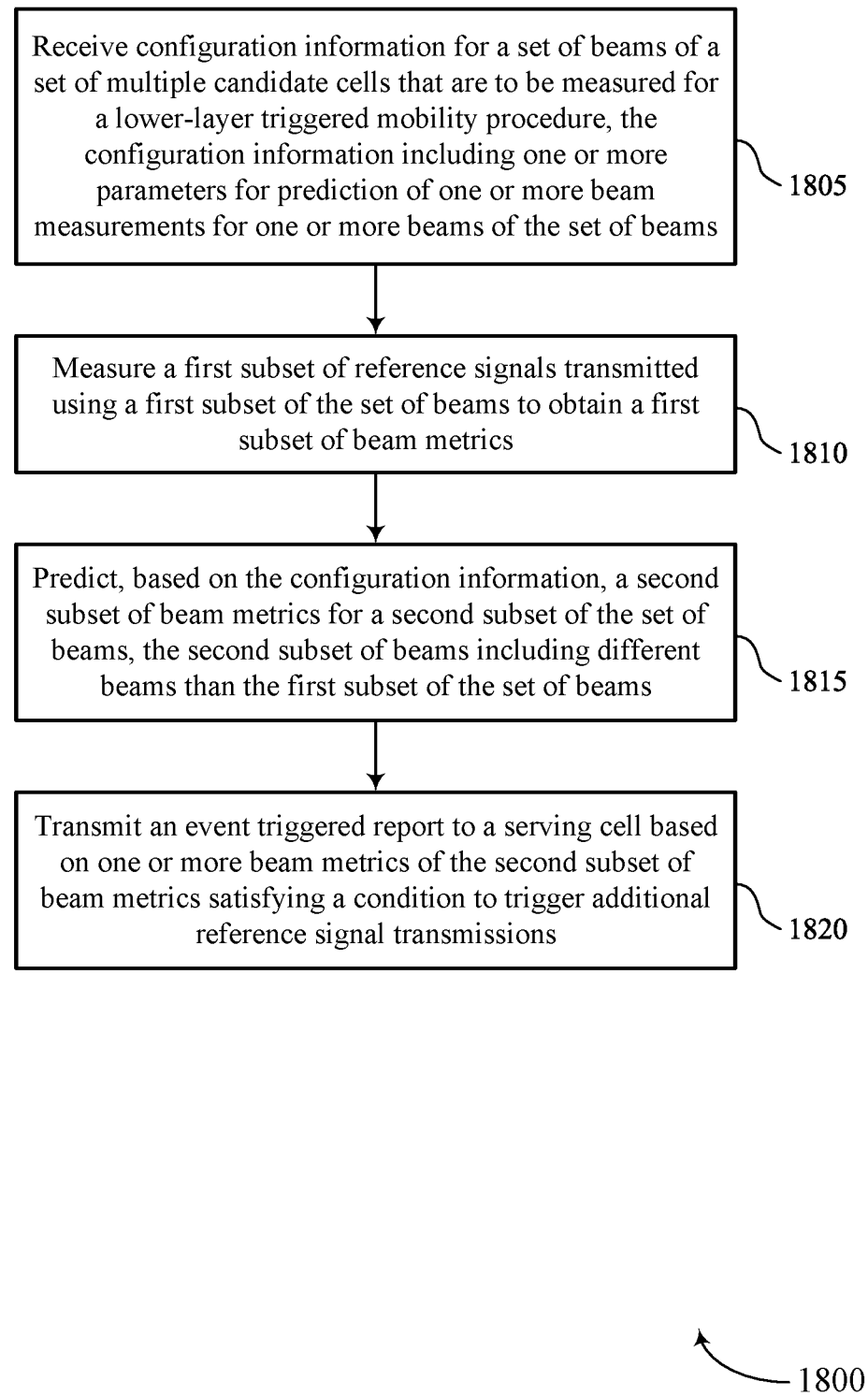

FIG. 18 shows a flowchart illustrating a method 1800 that supports conditional cell selection based on beam prediction in accordance with aspects of the present disclosure. The operations of the method 1800 may be implemented by a UE or its components as described herein. For example, the operations of the method 1800 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1805, the method may include receiving configuration information for a set of beams of a set of multiple candidate cells that are to be measured for a lower-layer triggered mobility procedure, the configuration information including one or more parameters for prediction of one or more beam measurements for one or more beams of the set of beams. The operations of block 1805 may be performed in accordance with examples as disclosed herein. In some examples, aspects of the operations of 1805 may be performed by an LTM configuration manager 825 as described with reference to FIG. 8.

At 1810, the method may include measuring a first subset of reference signals transmitted using a first subset of the set of beams to obtain a first subset of beam metrics. The operations of block 1810 may be performed in accordance with examples as disclosed herein. In some examples, aspects of the operations of 1810 may be performed by a measurement manager 830 as described with reference to FIG. 8.

At 1815, the method may include predicting, based on the configuration information, a second subset of beam metrics for a second subset of the set of beams, the second subset of beams including different beams than the first subset of the set of beams. The operations of block 1815 may be performed in accordance with examples as disclosed herein. In some examples, aspects of the operations of 1815 may be performed by a prediction manager 835 as described with reference to FIG. 8.

At 1820, the method may include transmitting an event triggered report to a serving cell based on one or more beam metrics of the second subset of beam metrics satisfying a condition to trigger additional reference signal transmissions. The operations of block 1820 may be performed in accordance with examples as disclosed herein. In some examples, aspects of the operations of 1820 may be performed by an aperiodic reference signal manager 845 as described with reference to FIG. 8.

Figure 19:
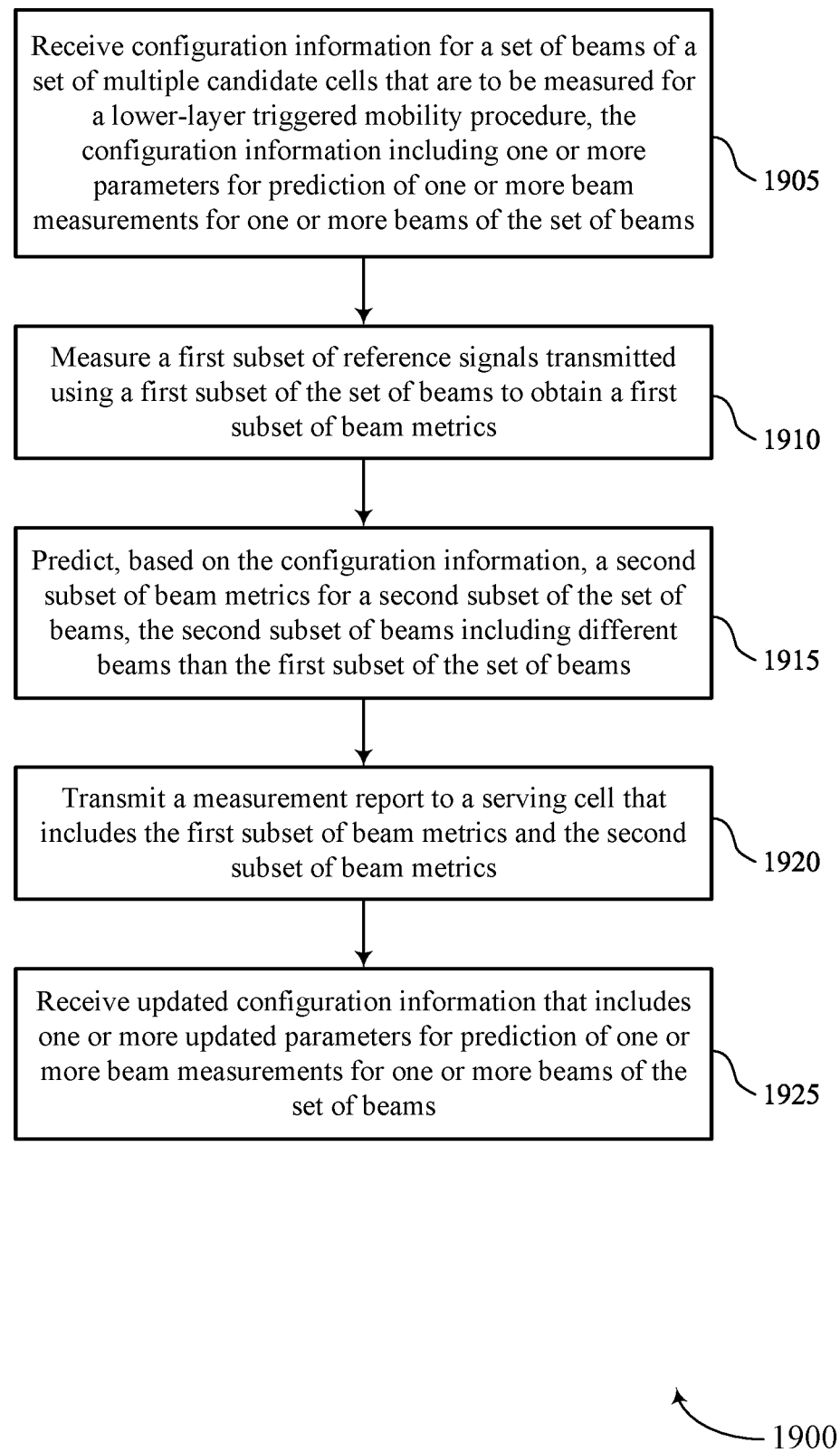

FIG. 19 shows a flowchart illustrating a method 1900 that supports conditional cell selection based on beam prediction in accordance with aspects of the present disclosure. The operations of the method 1900 may be implemented by a UE or its components as described herein. For example, the operations of the method 1900 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1905, the method may include receiving configuration information for a set of beams of a set of multiple candidate cells that are to be measured for a lower-layer triggered mobility procedure, the configuration information including one or more parameters for prediction of one or more beam measurements for one or more beams of the set of beams. The operations of block 1905 may be performed in accordance with examples as disclosed herein. In some examples, aspects of the operations of 1905 may be performed by an LTM configuration manager 825 as described with reference to FIG. 8.

At 1910, the method may include measuring a first subset of reference signals transmitted using a first subset of the set of beams to obtain a first subset of beam metrics. The operations of block 1910 may be performed in accordance with examples as disclosed herein. In some examples, aspects of the operations of 1910 may be performed by a measurement manager 830 as described with reference to FIG. 8.

At 1915, the method may include predicting, based on the configuration information, a second subset of beam metrics for a second subset of the set of beams, the second subset of beams including different beams than the first subset of the set of beams. The operations of block 1915 may be performed in accordance with examples as disclosed herein. In some examples, aspects of the operations of 1915 may be performed by a prediction manager 835 as described with reference to FIG. 8.

At 1920, the method may include transmitting a measurement report to a serving cell that includes the first subset of beam metrics and the second subset of beam metrics. The operations of block 1920 may be performed in accordance with examples as disclosed herein. In some examples, aspects of the operations of 1920 may be performed by a measurement manager 830 as described with reference to FIG. 8.

At 1925, the method may include receiving updated configuration information that includes one or more updated parameters for prediction of one or more beam measurements for one or more beams of the set of beams. The operations of block 1925 may be performed in accordance with examples as disclosed herein. In some examples, aspects of the operations of 1925 may be performed by an LTM configuration manager 825 as described with reference to FIG. 8.

Figure 20:
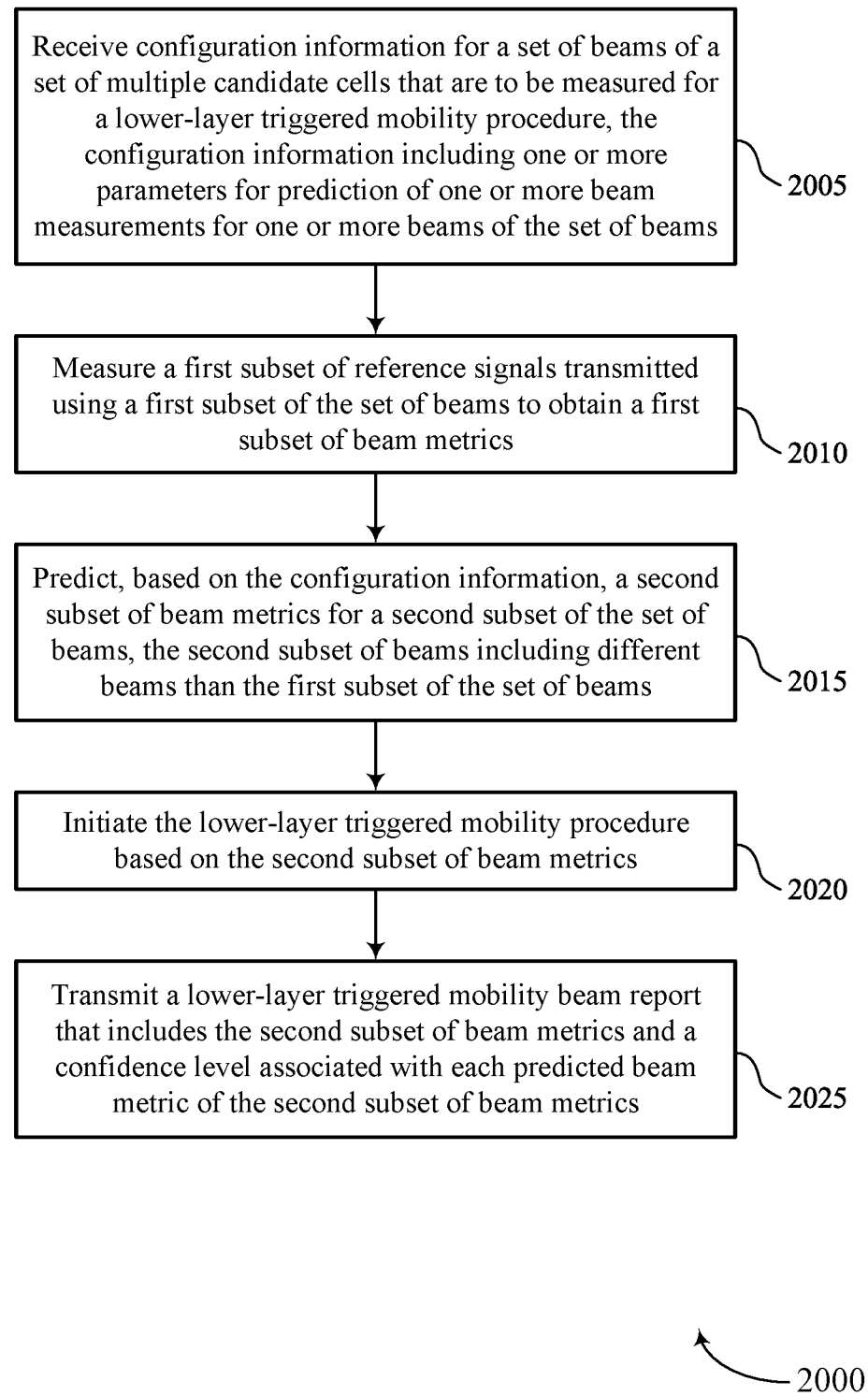

FIG. 20 shows a flowchart illustrating a method 2000 that supports conditional cell selection based on beam prediction in accordance with aspects of the present disclosure. The operations of the method 2000 may be implemented by a UE or its components as described herein. For example, the operations of the method 2000 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 2005, the method may include receiving configuration information for a set of beams of a set of multiple candidate cells that are to be measured for a lower-layer triggered mobility procedure, the configuration information including one or more parameters for prediction of one or more beam measurements for one or more beams of the set of beams. The operations of block 2005 may be performed in accordance with examples as disclosed herein. In some examples, aspects of the operations of 2005 may be performed by an LTM configuration manager 825 as described with reference to FIG. 8.

At 2010, the method may include measuring a first subset of reference signals transmitted using a first subset of the set of beams to obtain a first subset of beam metrics. The operations of block 2010 may be performed in accordance with examples as disclosed herein. In some examples, aspects of the operations of 2010 may be performed by a measurement manager 830 as described with reference to FIG. 8.

At 2015, the method may include predicting, based on the configuration information, a second subset of beam metrics for a second subset of the set of beams, the second subset of beams including different beams than the first subset of the set of beams. The operations of block 2015 may be performed in accordance with examples as disclosed herein. In some examples, aspects of the operations of 2015 may be performed by a prediction manager 835 as described with reference to FIG. 8.

At 2020, the method may include initiating the lower-layer triggered mobility procedure based on the second subset of beam metrics. The operations of block 2020 may be performed in accordance with examples as disclosed herein. In some examples, aspects of the operations of 2020 may be performed by a mobility manager 840 as described with reference to FIG. 8.

At 2025, the method may include transmitting a lower-layer triggered mobility beam report that includes the second subset of beam metrics and a confidence level associated with each predicted beam metric of the second subset of beam metrics. The operations of block 2025 may be performed in accordance with examples as disclosed herein. In some examples, aspects of the operations of 2025 may be performed by a measurement manager 830 as described with reference to FIG. 8.

Figure 21:
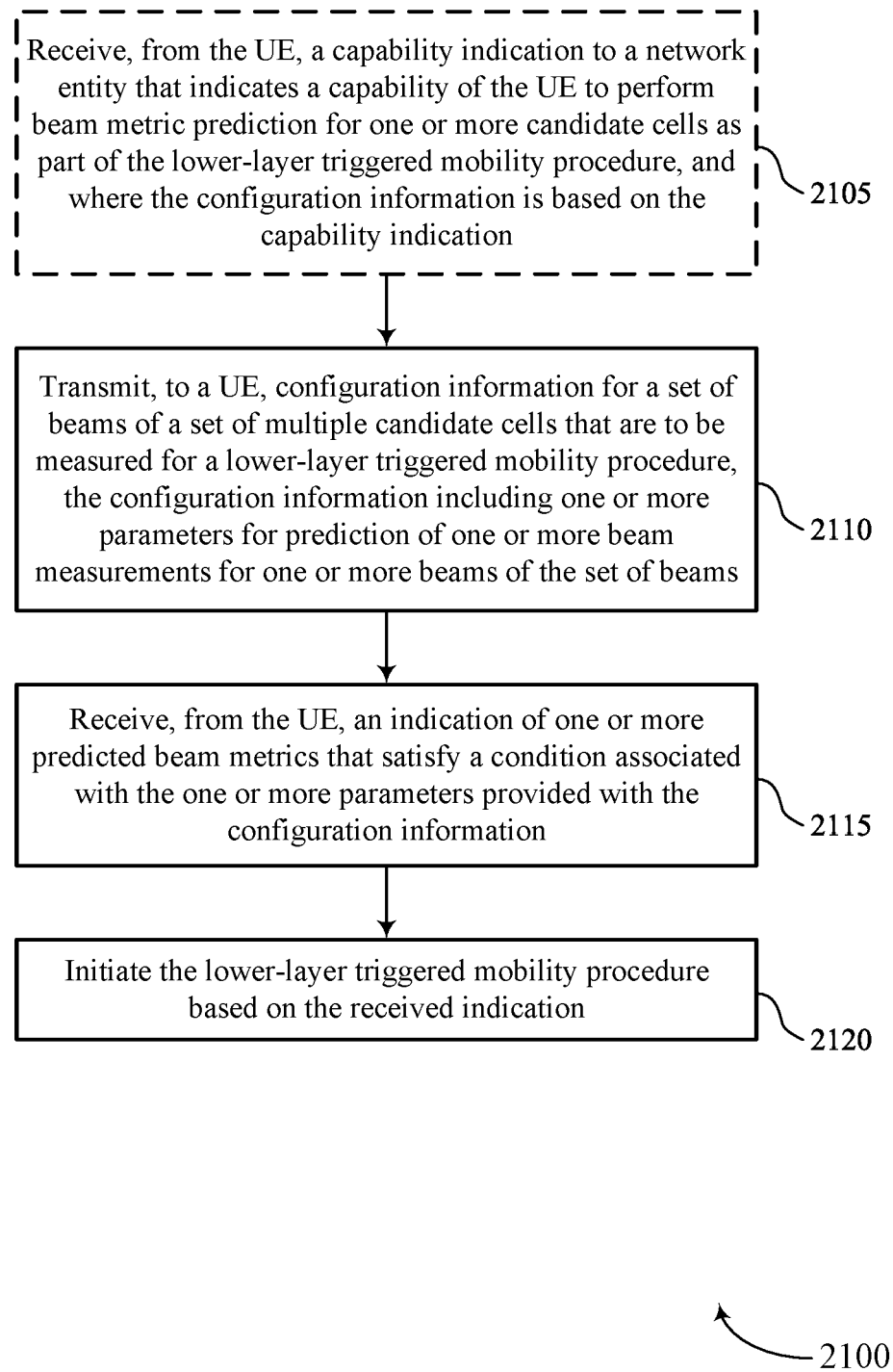

FIG. 21 shows a flowchart illustrating a method 2100 that supports conditional cell selection based on beam prediction in accordance with aspects of the present disclosure. The operations of the method 2100 may be implemented by a network entity or its components as described herein. For example, the operations of the method 2100 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

Optionally, at 2105, the method may include receiving, from the UE, a capability indication to a network entity that indicates a capability of the UE to perform beam metric prediction for one or more candidate cells as part of the lower-layer triggered mobility procedure, and where the configuration information is based on the capability indication. The operations of block 2105 may be performed in accordance with examples as disclosed herein. In some examples, aspects of the operations of 2105 may be performed by a capability manager 1245 as described with reference to FIG. 12.

At 2110, the method may include transmitting, to a UE, configuration information for a set of beams of a set of multiple candidate cells that are to be measured for a lower-layer triggered mobility procedure, the configuration information including one or more parameters for prediction of one or more beam measurements for one or more beams of the set of beams. The operations of block 2110 may be performed in accordance with examples as disclosed herein. In some examples, aspects of the operations of 2110 may be performed by an LTM configuration manager 1225 as described with reference to FIG. 12.

At 2115, the method may include receiving, from the UE, an indication of one or more predicted beam metrics that satisfy a condition associated with the one or more parameters provided with the configuration information. The operations of block 2115 may be performed in accordance with examples as disclosed herein. In some examples, aspects of the operations of 2115 may be performed by a metric report manager 1230 as described with reference to FIG. 12.

At 2120, the method may include initiating the lower-layer triggered mobility procedure based on the received indication. The operations of block 2120 may be performed in accordance with examples as disclosed herein. In some examples, aspects of the operations of 2120 may be performed by a mobility manager 1235 as described with reference to FIG. 12.

Figure 22:
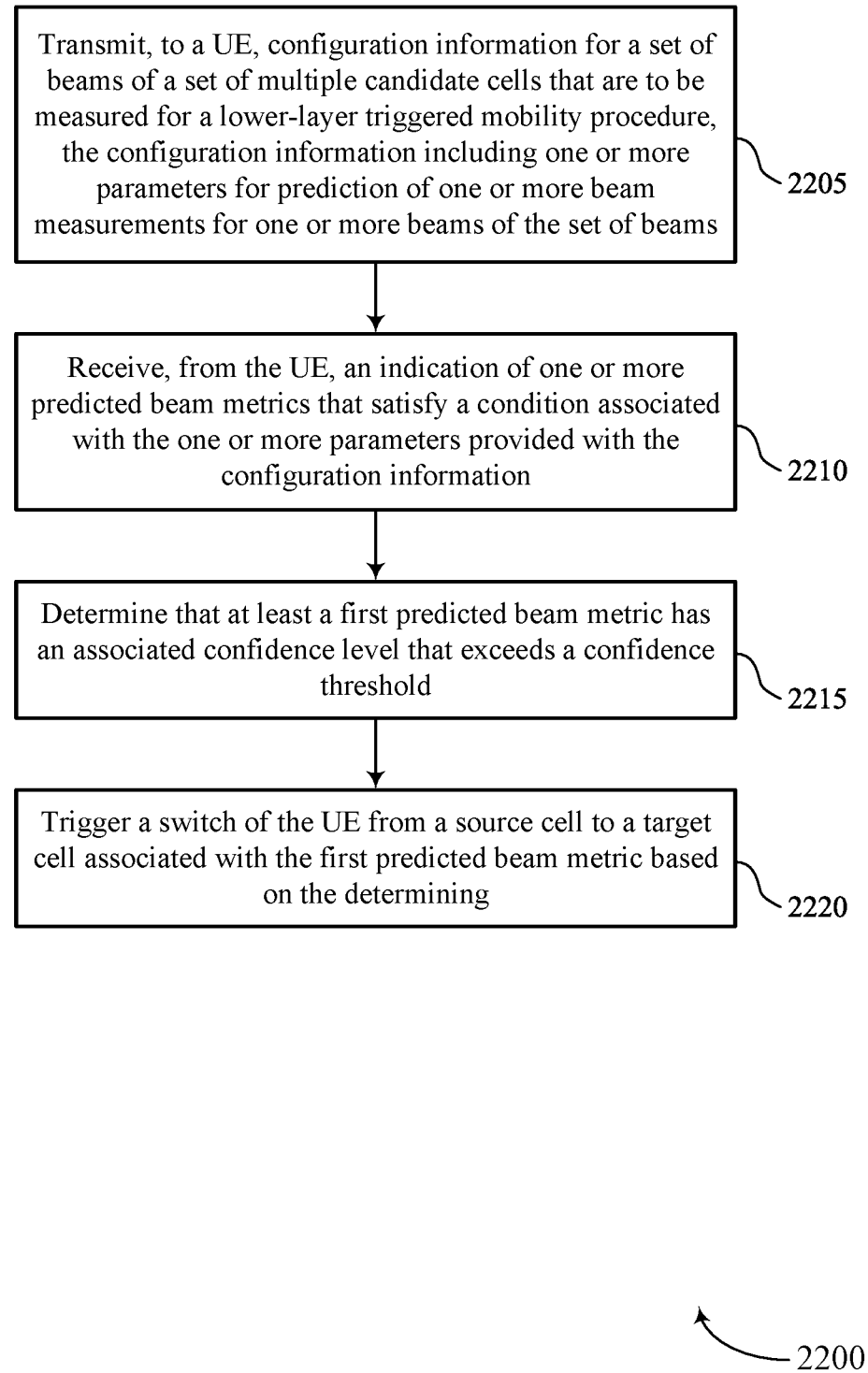

FIG. 22 shows a flowchart illustrating a method 2200 that supports conditional cell selection based on beam prediction in accordance with aspects of the present disclosure. The operations of the method 2200 may be implemented by a network entity or its components as described herein. For example, the operations of the method 2200 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 2205, the method may include transmitting, to a UE, configuration information for a set of beams of a set of multiple candidate cells that are to be measured for a lower-layer triggered mobility procedure, the configuration information including one or more parameters for prediction of one or more beam measurements for one or more beams of the set of beams. The operations of block 2205 may be performed in accordance with examples as disclosed herein. In some examples, aspects of the operations of 2205 may be performed by an LTM configuration manager 1225 as described with reference to FIG. 12.

At 2210, the method may include receiving, from the UE, an indication of one or more predicted beam metrics that satisfy a condition associated with the one or more parameters provided with the configuration information. The operations of block 2210 may be performed in accordance with examples as disclosed herein. In some examples, aspects of the operations of 2210 may be performed by a metric report manager 1230 as described with reference to FIG. 12.

At 2215, the method may include determining that at least a first predicted beam metric has an associated confidence level that exceeds a confidence threshold. The operations of block 2215 may be performed in accordance with examples as disclosed herein. In some examples, aspects of the operations of 2215 may be performed by a mobility manager 1235 as described with reference to FIG. 12.

At 2220, the method may include triggering a switch of the UE from a source cell to a target cell associated with the first predicted beam metric based on the determining. The operations of block 2220 may be performed in accordance with examples as disclosed herein. In some examples, aspects of the operations of 2220 may be performed by a mobility manager 1235 as described with reference to FIG. 12.

Figure 23:
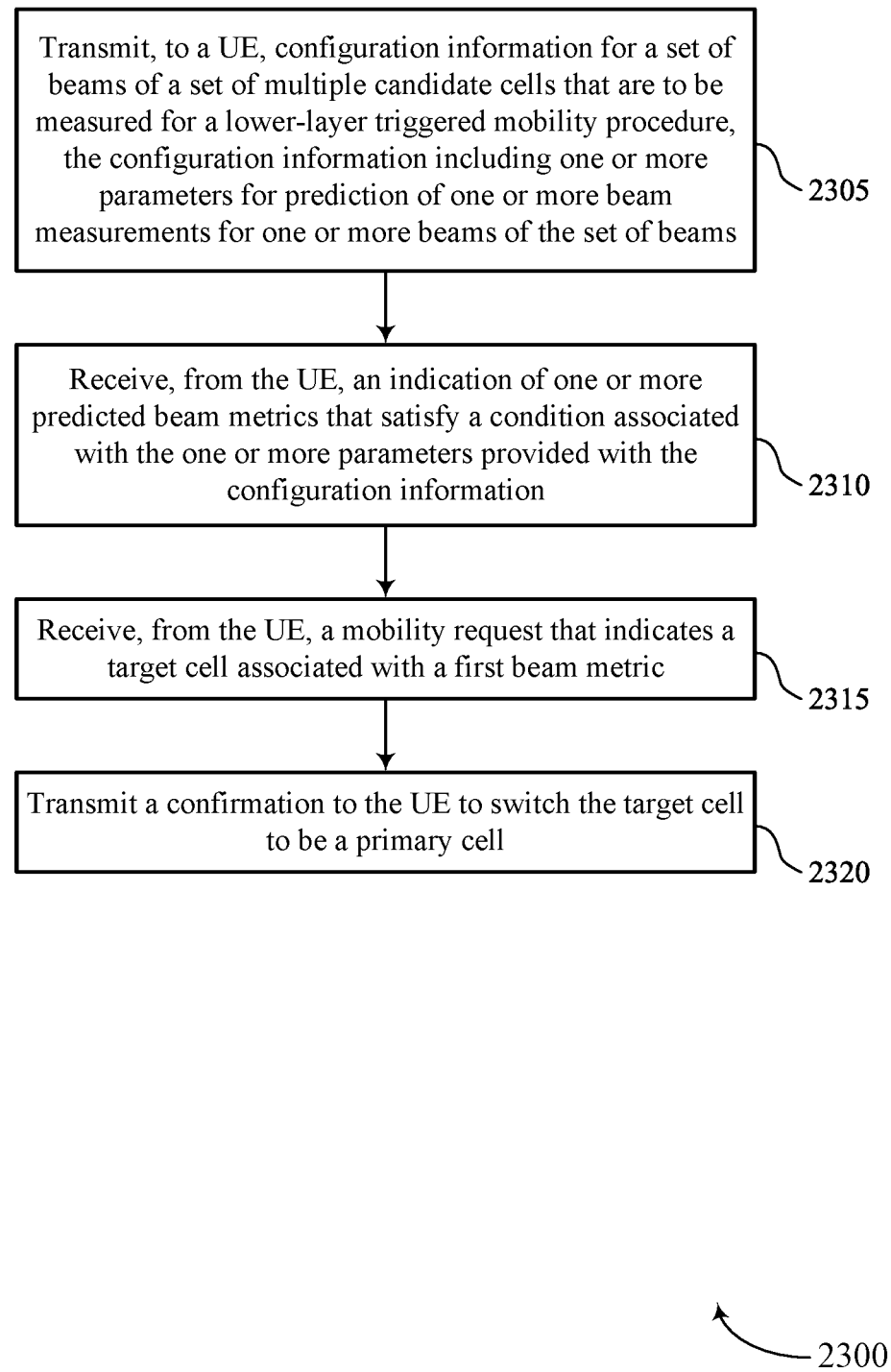

FIG. 23 shows a flowchart illustrating a method 2300 that supports conditional cell selection based on beam prediction in accordance with aspects of the present disclosure. The operations of the method 2300 may be implemented by a network entity or its components as described herein. For example, the operations of the method 2300 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 2305, the method may include transmitting, to a UE, configuration information for a set of beams of a set of multiple candidate cells that are to be measured for a lower-layer triggered mobility procedure, the configuration information including one or more parameters for prediction of one or more beam measurements for one or more beams of the set of beams. The operations of block 2305 may be performed in accordance with examples as disclosed herein. In some examples, aspects of the operations of 2305 may be performed by an LTM configuration manager 1225 as described with reference to FIG. 12.

At 2310, the method may include receiving, from the UE, an indication of one or more predicted beam metrics that satisfy a condition associated with the one or more parameters provided with the configuration information. The operations of block 2310 may be performed in accordance with examples as disclosed herein. In some examples, aspects of the operations of 2310 may be performed by a metric report manager 1230 as described with reference to FIG. 12.

At 2315, the method may include receiving, from the UE, a mobility request that indicates a target cell associated with a first beam metric. The operations of block 2315 may be performed in accordance with examples as disclosed herein. In some examples, aspects of the operations of 2315 may be performed by a mobility manager 1235 as described with reference to FIG. 12.

At 2320, the method may include transmitting a confirmation to the UE to switch the target cell to be a primary cell. The operations of block 2320 may be performed in accordance with examples as disclosed herein. In some examples, aspects of the operations of 2320 may be performed by a mobility manager 1235 as described with reference to FIG. 12.

Figure 24:
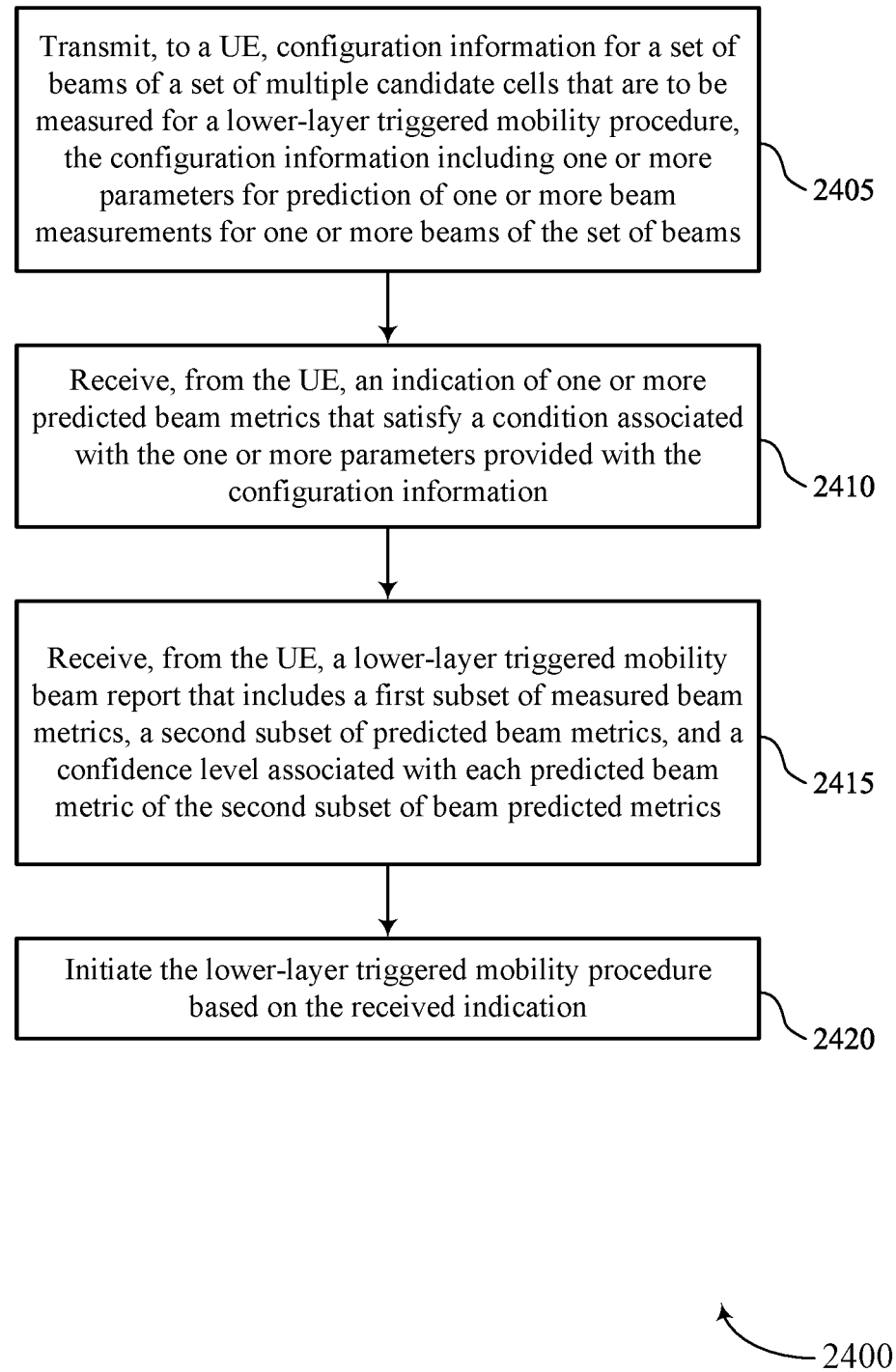

FIG. 24 shows a flowchart illustrating a method 2400 that supports conditional cell selection based on beam prediction in accordance with aspects of the present disclosure. The operations of the method 2400 may be implemented by a network entity or its components as described herein. For example, the operations of the method 2400 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 2405, the method may include transmitting, to a UE, configuration information for a set of beams of a set of multiple candidate cells that are to be measured for a lower-layer triggered mobility procedure, the configuration information including one or more parameters for prediction of one or more beam measurements for one or more beams of the set of beams. The operations of block 2405 may be performed in accordance with examples as disclosed herein. In some examples, aspects of the operations of 2405 may be performed by an LTM configuration manager 1225 as described with reference to FIG. 12.

At 2410, the method may include receiving, from the UE, an indication of one or more predicted beam metrics that satisfy a condition associated with the one or more parameters provided with the configuration information. The operations of block 2410 may be performed in accordance with examples as disclosed herein. In some examples, aspects of the operations of 2410 may be performed by a metric report manager 1230 as described with reference to FIG. 12.

At 2415, the method may include receiving, from the UE, a lower-layer triggered mobility beam report that includes a first subset of measured beam metrics, a second subset of predicted beam metrics, and a confidence level associated with each predicted beam metric of the second subset of beam predicted metrics. The operations of block 2415 may be performed in accordance with examples as disclosed herein. In some examples, aspects of the operations of 2415 may be performed by a metric report manager 1230 as described with reference to FIG. 12.

At 2420, the method may include initiating the lower-layer triggered mobility procedure based on the received indication. The operations of block 2420 may be performed in accordance with examples as disclosed herein. In some examples, aspects of the operations of 2420 may be performed by a mobility manager 1235 as described with reference to FIG. 12.

The following provides an overview of aspects of the present disclosure:

Aspect 1: A method for wireless communications at a UE, comprising: receiving configuration information for a set of beams of a plurality of candidate cells that are to be measured for a lower-layer triggered mobility procedure, the configuration information including one or more parameters for prediction of one or more beam measurements for one or more beams of the set of beams; measuring a first subset of reference signals transmitted using a first subset of the set of beams to obtain a first subset of beam metrics; predicting, based at least in part on the configuration information, a second subset of beam metrics for a second subset of the set of beams, the second subset of beams including different beams than the first subset of the set of beams; and initiating the lower-layer triggered mobility procedure based at least in part on the second subset of beam metrics.

Aspect 2: The method of aspect 1, wherein the predicting comprises: configuring a separate machine learning module for each cell of the plurality of candidate cells, or one machine learning module for two or more candidate cells of the plurality of candidate cells; and obtaining an output from one or more machine learning modules that provides the second subset of beam metrics.

Aspect 3: The method of aspect 2, wherein the predicting further comprises: providing one or more channel measurements from one or more of a serving cell or one or more of the first subset of beam metrics as an input to the one or more machine learning modules, and wherein the output from the one or more machine learning modules further includes a confidence value associated with each predicted beam metric.

Aspect 4: The method of any of aspects 1 through 3, wherein the initiating the lower-layer triggered mobility procedure comprises: determining that at least a first beam metric of the second subset of beam metrics has an associated confidence level that exceeds a confidence threshold;

and triggering the lower-layer triggered mobility procedure based at least in part on the determining.

Aspect 5: The method of aspect 4, wherein the initiating the lower-layer triggered mobility procedure further comprises: transmitting an uplink communication to a target cell associated with the first beam metric to autonomously switch the target cell to be a primary cell.

Aspect 6: The method of any of aspects 4 through 5, wherein the initiating the lower-layer triggered mobility procedure further comprises: transmitting a mobility request to a source cell that indicates a target cell associated with the first beam metric; and receiving a confirmation to switch the target cell to be a primary cell.

Aspect 7: The method of any of aspects 1 through 6, wherein the initiating the lower-layer triggered mobility procedure comprises: transmitting an event triggered report to a serving cell based at least in part on one or more beam metrics of the second subset of beam metrics satisfying a condition to trigger additional reference signal transmissions.

Aspect 8: The method of aspect 7, wherein the condition to trigger additional reference signal transmissions is a predicted reference signal received power (RSRP) that is above a RSRP threshold value and a confidence that is below a confidence threshold value.

Aspect 9: The method of any of aspects 7 through 8, wherein the event triggered report triggers transmission of an on-demand aperiodic reference signal transmission on a least one beam of the second subset of beams, and wherein cell selection is based at least in part on a measurement of the on-demand aperiodic reference signal.

Aspect 10: The method of any of aspects 1 through 9, further comprising: transmitting a measurement report to a serving cell that includes the first subset of beam metrics and the second subset of beam metrics; and receiving updated configuration information that includes one or more updated parameters for prediction of one or more beam measurements for one or more beams of the set of beams.

Aspect 11: The method of any of aspects 1 through 10, wherein the initiating the lower-layer triggered mobility procedure comprises: transmitting a lower-layer triggered mobility beam report that includes the second subset of beam metrics and a confidence level associated with each predicted beam metric of the second subset of beam metrics.

Aspect 12: The method of aspect 11, wherein the lower-layer triggered mobility beam report further includes one or more of an indication for each reported beam metric that indicates whether the associated beam metric is a measured metric or a predicted metric, or a time step for each predicted metric, and wherein each reported beam metric is a layer-one (L1) or a layer-three (L3) metric.

Aspect 13: The method of any of aspects 1 through 12, further comprising: transmitting a capability indication to a network entity that indicates a capability of the UE to perform beam metric prediction for one or more candidate cells as part of the lower-layer triggered mobility procedure.

Aspect 14: A method for wireless communications at a network entity, comprising: transmitting, to a UE, configuration information for a set of beams of a plurality of candidate cells that are to be measured for a lower-layer triggered mobility procedure, the configuration information including one or more parameters for prediction of one or more beam measurements for one or more beams of the set of beams; receiving, from the UE, an indication of one or more predicted beam metrics that satisfy a condition associated with the one or more parameters provided with the configuration information; and initiating the lower-layer triggered mobility procedure based at least in part on the received indication.

Aspect 15: The method of aspect 14, wherein the configuration information indicates a configuration for a separate machine learning module for each cell of the plurality of candidate cells, or one machine learning module for two or more candidate cells of the plurality of candidate cells.

Aspect 16: The method of aspect 15, wherein one or more channel measurements from one or more of a serving cell or one or more measured beam metrics on one or more of the candidate cells are provided as an input to the one or more machine learning modules, and wherein an output from the one or more machine learning modules includes a confidence value associated with each predicted beam metric.

Aspect 17: The method of any of aspects 14 through 16, wherein the initiating the lower-layer triggered mobility procedure comprises: determining that at least a first predicted beam metric has an associated confidence level that exceeds a confidence threshold; and triggering a switch of the UE from a source cell to a target cell associated with the first predicted beam metric based at least in part on the determining.

Aspect 18: The method of any of aspects 14 through 17, wherein the UE transmits an uplink communication to a target cell associated with a predicted beam metric to autonomously switch a target cell to be a primary cell.

Aspect 19: The method of any of aspects 14 through 18, further comprising: receiving, from the UE, a mobility request that indicates a target cell associated with a first beam metric; and transmitting a confirmation to the UE to switch the target cell to be a primary cell.

Aspect 20: The method of any of aspects 14 through 19, wherein the receiving the indication of one or more predicted beam metrics comprises: receiving, from the UE, an event triggered report that indicates one or more predicted beam metrics satisfies a condition to trigger additional reference signal transmissions.

Aspect 21: The method of aspect 20, wherein the condition to trigger additional reference signal transmissions is a predicted reference signal received power (RSRP) that is above a RSRP threshold value and a confidence that is below a confidence threshold value.

Aspect 22: The method of any of aspects 20 through 21, further comprising: transmitting an indication to one or more of the candidate cells to trigger an on-demand aperiodic reference signal transmission on a least one beam of the one or more candidate cells, and wherein cell selection is based at least in part on a measurement at the UE of the on-demand aperiodic reference signal.

Aspect 23: The method of any of aspects 14 through 22, wherein the receiving the indication of one or more predicted beam metrics comprises receiving a measurement report from the UE that includes a first subset of beam metrics that are measured beam metrics and a second subset of beam metrics that are predicted beam metrics, and wherein the method further comprises: transmitting, to the UE, updated configuration information that includes one or more updated parameters for prediction of one or more beam measurements for one or more beams of the set of beams.

Aspect 24: The method of any of aspects 14 through 23, wherein the receiving the indication of one or more predicted beam metrics comprises: receiving, from the UE, a lower-layer triggered mobility beam report that includes a first subset of measured beam metrics, a second subset of predicted beam metrics, and a confidence level associated with each predicted beam metric of the second subset of beam predicted metrics.

Aspect 25: The method of aspect 24, wherein the lower-layer triggered mobility beam report further includes one or more of an indication for each reported beam metric that indicates whether the associated beam metric is a measured metric or a predicted metric, or a time step for each predicted metric, and wherein each reported beam metric is a layer-one (L1) or a layer-three (L3) metric.

Aspect 26: The method of any of aspects 14 through 25, further comprising: receiving, from the UE, a capability indication to a network entity that indicates a capability of the UE to perform beam metric prediction for one or more candidate cells as part of the lower-layer triggered mobility procedure, and wherein the configuration information is based at least in part on the capability indication.

Aspect 27: A UE for wireless communications, comprising one or more memories storing processor-executable code, and one or more processors coupled with the one or more memories and individually or collectively operable to execute the code to cause the UE to perform a method of any of aspects 1 through 13.

Aspect 28: A UE for wireless communications, comprising at least one means for performing a method of any of aspects 1 through 13.

Aspect 29: A non-transitory computer-readable medium storing code for wireless communications, the code comprising instructions executable by a processor to perform a method of any of aspects 1 through 13.

Aspect 30: A network entity for wireless communications, comprising one or more memories storing processor-executable code, and one or more processors coupled with the one or more memories and individually or collectively operable to execute the code to cause the network entity to perform a method of any of aspects 14 through 26.

Aspect 31: A network entity for wireless communications, comprising at least one means for performing a method of any of aspects 14 through 26.

Aspect 32: A non-transitory computer-readable medium storing code for wireless communications, the code comprising instructions executable by a processor to perform a method of any of aspects 14 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:
   one or more memories storing processor-executable code; and
   one or more processors coupled with the one or more memories and individually or collectively operable to execute the code to cause the UE to:
     receive configuration information corresponding to a lower-layer triggered mobility procedure, the configuration information indicating a set of beams of a plurality of candidate cells that are to be measured as part of the lower-layer triggered mobility procedure and including one or more parameters for prediction of one or more beam measurements for one or more beams of the set of beams;
     measure a first subset of reference signals transmitted using a first subset of the set of beams to obtain a first subset of beam metrics;
     predict, based at least in part on the configuration information, a second subset of beam metrics for a second subset of the set of beams, the second subset of beam metrics including different beams than the first subset of the set of beams, wherein each predicted beam metric of the second subset of beam metrics is associated with a respective confidence value based at least in part on the prediction; and
     initiate the lower-layer triggered mobility procedure based at least in part on the second subset of beam metrics and on at least a first confidence level of the respective confidence values that exceeds a confidence threshold.

2. The UE of claim 1, wherein, to predict, the one or more processors are individually or collectively operable to execute the code to cause the UE to:
   configure a separate machine learning module for each cell of the plurality of candidate cells, or one machine learning module for two or more candidate cells of the plurality of candidate cells; and
   obtain an output from one or more machine learning modules that provides the second subset of beam metrics.

3. The UE of claim 2, wherein, to predict, the one or more processors are individually or collectively further operable to execute the code to cause the UE to:
   provide one or more channel measurements from one or more of a serving cell or one or more of the first subset of beam metrics as an input to the one or more machine learning modules, and wherein the output from the one or more machine learning modules further includes a confidence value associated with each predicted beam metric.

4. The UE of claim 1, wherein, to initiate the lower-layer triggered mobility procedure, the one or more processors are individually or collectively further operable to execute the code to cause the UE to:
transmit an uplink communication to a target cell associated with a first beam metric of the second subset of beam metrics to autonomously switch the target cell to be a primary cell.

5. The UE of claim 1, wherein, to initiate the lower-layer triggered mobility procedure, the one or more processors are individually or collectively further operable to execute the code to cause the UE to:
transmit a mobility request to a source cell that indicates a target cell associated with a first beam metric of the second subset of beam metrics; and
receive a confirmation to switch the target cell to be a primary cell.

6. The UE of claim 1, wherein, to initiate the lower-layer triggered mobility procedure, the one or more processors are individually or collectively operable to execute the code to cause the UE to:
transmit an event triggered report to a serving cell based at least in part on one or more beam metrics of the second subset of beam metrics satisfying a condition to trigger additional reference signal transmissions.

7. The UE of claim 6, wherein the condition to trigger additional reference signal transmissions is a predicted reference signal received power (RSRP) that is above a RSRP threshold value and a confidence that is below a confidence threshold value.

8. The UE of claim 6, wherein the event triggered report triggers transmission of an on-demand aperiodic reference signal transmission on a least one beam of the second subset of beam metrics, and wherein cell selection is based at least in part on a measurement of the on-demand aperiodic reference signal.

9. The UE of claim 1, wherein the one or more processors are individually or collectively further operable to execute the code to cause the UE to:
transmit a measurement report to a serving cell that includes the first subset of beam metrics and the second subset of beam metrics; and
receive updated configuration information that includes one or more updated parameters for prediction of one or more beam measurements for one or more beams of the set of beams.

10. The UE of claim 1, wherein, to initiate the lower-layer triggered mobility procedure, the one or more processors are individually or collectively operable to execute the code to cause the UE to:
transmit a lower-layer triggered mobility beam report that includes the second subset of beam metrics and a confidence level associated with each predicted beam metric of the second subset of beam metrics.

11. The UE of claim 10, wherein the lower-layer triggered mobility beam report further includes one or more of an indication for each reported beam metric that indicates whether the associated beam metric is a measured metric or a predicted metric, or a time step for each predicted metric, and wherein each reported beam metric is a layer-one (L1) or a layer-three (L3) metric.

12. The UE of claim 1, wherein the one or more processors are individually or collectively further operable to execute the code to cause the UE to:
transmit a capability indication to a network entity that indicates a capability of the UE to perform beam metric prediction for one or more candidate cells as part of the lower-layer triggered mobility procedure.

13. A network entity, comprising:
one or more memories storing processor-executable code; and
one or more processors coupled with the one or more memories and individually or collectively operable to execute the code to cause the network entity to:
transmit, to a user equipment (UE), configuration information corresponding to a lower-layer triggered mobility procedure, the configuration information indicating a set of beams of a plurality of candidate cells that are to be measured as part of the lower-layer triggered mobility procedure and including one or more parameters for prediction of one or more beam measurements for one or more beams of the set of beams;
receive, from the UE, an indication of one or more predicted beam metrics that satisfy a condition associated with the one or more parameters provided with the configuration information, wherein each of the predicted beam metrics is associated with a respective confidence value; and
initiate the lower-layer triggered mobility procedure based at least in part on the received indication and on at least a first confidence level of the respective confidence values that exceeds a confidence threshold.

14. The network entity of claim 13, wherein the configuration information indicates a configuration for a separate machine learning module for each cell of the plurality of candidate cells, or one machine learning module for two or more candidate cells of the plurality of candidate cells.

15. The network entity of claim 14, wherein one or more channel measurements from one or more of a serving cell or one or more measured beam metrics on one or more of the candidate cells are provided as an input to the one or more machine learning modules, and wherein an output from the one or more machine learning modules includes a confidence value associated with each predicted beam metric.

16. The network entity of claim 13, wherein the UE transmits an uplink communication to a target cell associated with a predicted beam metric to autonomously switch a target cell to be a primary cell.

17. The network entity of claim 13, wherein the one or more processors are individually or collectively further operable to execute the code to cause the network entity to:
receive, from the UE, a mobility request that indicates a target cell associated with a first beam metric; and
transmit a confirmation to the UE to switch the target cell to be a primary cell.

18. The network entity of claim 13, wherein, to receive the indication of one or more predicted beam metrics, the one or more processors are individually or collectively operable to execute the code to cause the network entity to:
receive, from the UE, an event triggered report that indicates one or more predicted beam metrics satisfies a condition to trigger additional reference signal transmissions.

19. The network entity of claim 18, wherein the condition to trigger additional reference signal transmissions is a predicted reference signal received power (RSRP) that is above a RSRP threshold value and a confidence that is below a confidence threshold value.

20. The network entity of claim 18, wherein the one or more processors are individually or collectively further operable to execute the code to cause the network entity to:

transmit an indication to one or more of the candidate cells to trigger an on-demand aperiodic reference signal transmission on a least one beam of the one or more candidate cells, and wherein cell selection is based at least in part on a measurement at the UE of the on-demand aperiodic reference signal.

21. The network entity of claim 13, wherein the receiving the indication of one or more predicted beam metrics comprises receiving a measurement report from the UE that includes a first subset of beam metrics that are measured beam metrics and a second subset of beam metrics that are predicted beam metrics, and the one or more processors are individually or collectively further operable to execute the code to cause the network entity to:
 transmit, to the UE, updated configuration information that includes one or more updated parameters for prediction of one or more beam measurements for one or more beams of the set of beams.

22. The network entity of claim 13, wherein, to receive the indication of one or more predicted beam metrics, the one or more processors are individually or collectively operable to execute the code to cause the network entity to:
 receive, from the UE, a lower-layer triggered mobility beam report that includes a first subset of measured beam metrics, a second subset of predicted beam metrics, and a confidence level associated with each predicted beam metric of the second subset of beam predicted metrics.

23. The network entity of claim 22, wherein the lower-layer triggered mobility beam report further includes one or more of an indication for each reported beam metric that indicates whether the associated beam metric is a measured metric or a predicted metric, or a time step for each predicted metric, and wherein each reported beam metric is a layer-one (L1) or a layer-three (L3) metric.

24. The network entity of claim 13, wherein the one or more processors are individually or collectively further operable to execute the code to cause the network entity to:
 receive, from the UE, a capability indication to a network entity that indicates a capability of the UE to perform beam metric prediction for one or more candidate cells as part of the lower-layer triggered mobility procedure, and wherein the configuration information is based at least in part on the capability indication.

25. A method for wireless communications at a user equipment (UE), comprising:
 receiving configuration information corresponding to a lower-layer triggered mobility procedure, the configuration information indicating a set of beams of a plurality of candidate cells that are to be measured as part of the lower-layer triggered mobility procedure and including one or more parameters for prediction of one or more beam measurements for one or more beams of the set of beams;
 measuring a first subset of reference signals transmitted using a first subset of the set of beams to obtain a first subset of beam metrics;
 predicting, based at least in part on the configuration information, a second subset of beam metrics for a second subset of the set of beams, the second subset of beam metrics including different beams than the first subset of the set of beams, wherein each predicted beam metric of the second subset of beam metrics is associated with a respective confidence value based at least in part on the prediction; and
 initiating the lower-layer triggered mobility procedure based at least in part on the second subset of beam metrics and on at least a first confidence level of the respective confidence values that exceeds a confidence threshold.

26. The method of claim 25, wherein the predicting comprises:
 configuring a separate machine learning module for each cell of the plurality of candidate cells, or one machine learning module for two or more candidate cells of the plurality of candidate cells; and
 obtaining an output from one or more machine learning modules that provides the second subset of beam metrics.

27. A method for wireless communications at a network entity, comprising:
 transmitting, to a user equipment (UE), configuration information corresponding to a lower-layer triggered mobility procedure, the configuration information indicating a set of beams of a plurality of candidate cells that are to be measured as part of the lower-layer triggered mobility procedure and including one or more parameters for prediction of one or more beam measurements for one or more beams of the set of beams;
 receiving, from the UE, an indication of one or more predicted beam metrics that satisfy a condition associated with the one or more parameters provided with the configuration information, wherein each of the predicted beam metrics is associated with a respective confidence value; and
 initiating the lower-layer triggered mobility procedure based at least in part on the received indication and on at least a first confidence level of the respective confidence values that exceeds a confidence threshold.

28. The method of claim 27, wherein the configuration information indicates a configuration for a separate machine learning module for each cell of the plurality of candidate cells, or one machine learning module for two or more candidate cells of the plurality of candidate cells.

* * * * *